United States Patent
Xu

(10) Patent No.: US 10,117,253 B2
(45) Date of Patent: Oct. 30, 2018

(54) MOBILE TERMINAL AND RESOURCE MANAGEMENT METHOD OF MOBILE TERMINAL

(71) Applicant: Huawei Technologies Co., Ltd., Shenzhen (CN)

(72) Inventor: Yang Xu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/620,303

(22) Filed: Jun. 12, 2017

(65) Prior Publication Data

US 2017/0280437 A1 Sep. 28, 2017

Related U.S. Application Data

(63) Continuation of application No. PCT/CN2015/088837, filed on Sep. 2, 2015.

(30) Foreign Application Priority Data

Dec. 12, 2014 (CN) .......................... 2014 1 0768512

(51) Int. Cl.
*H04M 1/00* (2006.01)
*H04W 72/04* (2009.01)
(Continued)

(52) U.S. Cl.
CPC ...... *H04W 72/048* (2013.01); *G06F 9/45533* (2013.01); *G06F 11/30* (2013.01);
(Continued)

(58) Field of Classification Search
CPC ..... H04W 4/003; H04W 48/18; H04W 72/06; H04W 72/048; H04W 72/0493; H04M 1/72519; G06F 9/4443; G06F 9/45533
(Continued)

(56) References Cited

U.S. PATENT DOCUMENTS 8,874,167 B2  10/2014  Qiu et al.
2008/0034423 A1  2/2008  Durix et al.
(Continued)

FOREIGN PATENT DOCUMENTS

CN  102404449 A  4/2012
CN  103049289 A  4/2013
(Continued)

OTHER PUBLICATIONS

Foreign Communication From a Counterpart Application, European Application No. 15866644.6, Extended European Search Report dated Oct. 26, 2017, 15 pages.
(Continued)

*Primary Examiner* — Quochien B Vuong
(74) *Attorney, Agent, or Firm* — Conley Rose, P.C.

(57) ABSTRACT

A mobile terminal, includes a virtual resource sharing control system, a modem, and multiple operating systems, where multiple subscriber identity module (SIM) cards are deployed in the modem, a first operating system is configured to receive a card operation for a first SIM card in the multiple SIM cards, and notify a second operating system and the virtual resource sharing control system of the card operation request. The virtual resource sharing control system is configured to perform a card operation on the first SIM card using the modem, and send a first feedback result of the card operation to the first operating system and the second operating system, and the second operating system is configured to manage and monitor the current status of the first SIM card in the second operating system according to the card operation request or the first feedback result.

15 Claims, 17 Drawing Sheets

(51) Int. Cl.

| | | |
|---|---|---|
| *G06F 11/30* | (2006.01) | |
| *H04W 4/60* | (2018.01) | |
| *H04W 76/10* | (2018.01) | |
| *G06F 9/455* | (2018.01) | |
| *H04M 1/725* | (2006.01) | |

(52) U.S. Cl.
CPC ......... *H04M 1/72563* (2013.01); *H04W 4/60* (2018.02); *H04W 76/10* (2018.02)

(58) Field of Classification Search
USPC .................................. 455/558, 552.1, 553.1
See application file for complete search history.

(56) References Cited

U.S. PATENT DOCUMENTS

| | | | |
|---|---|---|---|
| 2008/0064443 | A1 | 3/2008 | Shin et al. |
| 2008/0162691 | A1 | 7/2008 | Zhang et al. |
| 2011/0151832 | A1* | 6/2011 | Lai ..................... H04M 15/00 455/407 |
| 2012/0064945 | A1 | 3/2012 | Kim |
| 2012/0081353 | A1 | 4/2012 | Yusupov et al. |
| 2015/0052264 | A1 | 2/2015 | Yuan et al. |
| 2015/0099562 | A1 | 4/2015 | Xiong |
| 2016/0183081 | A1* | 6/2016 | Flores Cuadrado ................ H04B 1/3816 455/558 |

FOREIGN PATENT DOCUMENTS

| | | |
|---|---|---|
| CN | 103163967 A | 6/2013 |
| CN | 103281797 A | 9/2013 |
| CN | 103391535 A | 11/2013 |
| CN | 103823726 A | 5/2014 |
| CN | 104159329 A | 11/2014 |
| CN | 104536869 A | 4/2015 |
| EP | 0574691 A1 | 5/1993 |
| EP | 2605556 A2 | 6/2013 |
| GB | 2487275 | 7/2012 |
| WO | 2011109750 A1 | 9/2011 |

OTHER PUBLICATIONS

Machine Translation and Abstract of Chinese Publication No. CN103049289, Apr. 17, 2013, 8 pages.
Machine Translation and Abstract of Chinese Publication No. CN103281797, Sep. 4, 2013, 10 pages.
Machine Translation and Abstract of Chinese Publication No. CN103823726, May 28, 2014, 9 pages.
Machine Translation and Abstract of Chinese Publication No. CN104159329, Nov. 19, 2014, 10 pages.
Machine Translation and Abstract of Chinese Publication No. CN104536869, Apr. 22, 2015, 37 pages.
Foreign Communication From a Counterpart Application, Chinese Application No. 201410768512.2, Chinese Search Report dated Dec. 11, 2016, 2 pages.
Foreign Communication From a Counterpart Application, Chinese Application No. 201410768512.2, Chinese Office Action dated Dec. 19, 2016, 4 pages.
Foreign Communication From a Counterpart Application, PCT Application No. PCT/CN2015/088837, English Translation of International Search Report dated Dec. 1, 2015, 2 pages.
Foreign Communication From a Counterpart Application, PCT Application No. PCT/CN2015/088837, English Translation of Written Opinion dated Dec. 1, 2015, 7 pages.

* cited by examiner

MOBILE TERMINAL AND RESOURCE MANAGEMENT METHOD OF MOBILE TERMINAL

CROSS-REFERENCE TO RELATED APPLICATIONS

This application is a continuation of International Patent Application No. PCT/CN2015/088837 filed on Sep. 2, 2015, which claims priority to Chinese Patent Application No. 201410768512.2 filed on Dec. 12, 2014. The disclosures of the aforementioned applications are hereby incorporated by reference in their entireties.

TECHNICAL FIELD

Embodiments of the present disclosure relate to the field of communications technologies, and in particular, to a mobile terminal and a resource management method of the mobile terminal.

BACKGROUND

People have stronger requirements for mobile office, private modes, mobile phone security, and the like. For example, a mobile phone may be used both for office and as a regular mobile phone. According to a technology of mobile phone terminal virtualization, two or more operating systems can run on one mobile phone, which may meet a requirement such as mobile office. An event that a user can deal with using two or more mobile phones originally can be dealt with using only one mobile phone currently.

In other approaches, only a solution to run dual subscriber identity module (SIM) cards in multiple operating systems is provided, and a solution to managing the dual SIM cards is not provided. Therefore, a potential risk is in unified management of system resources.

SUMMARY

On one hand, embodiments of the present disclosure provide a mobile terminal and a resource management method of the mobile terminal. In this way, each operating system of the mobile terminal can monitor and manage usage statuses of multiple SIM card resources of the mobile terminal in a real time manner, consistency is ensured in the usage statuses of the multiple SIM card resources in the mobile terminal, and the mobile terminal implements coordinated management of the multiple SIM card resources in multiple operating systems.

On the other hand, embodiments of the present disclosure further provide a mobile terminal and a resource management method of the mobile terminal. In this way, each operating system of the mobile terminal can monitor and manage a usage status of a channel resource of the mobile terminal in a real time manner, consistency is ensured in the usage statuses of the channel resource in the mobile terminal, and the mobile terminal implements coordinated management of the channel resource in the multiple operating systems.

According to a first aspect, a mobile terminal is provided, the mobile terminal includes a virtual resource sharing control system, a modem, and multiple operating systems, and multiple SIM cards are deployed in the modem. A first operating system in the multiple operating systems is configured to receive a card operation request of a user of the mobile terminal for a first SIM card in the multiple SIM cards, and notify a second operating system in the multiple operating systems and the virtual resource sharing control system of the card operation request, where the first operating system is an operating system that is in the multiple operating systems and that runs in foreground, and the second operating system is one or more operating systems, except the first operating system, in the multiple operating systems. The virtual resource sharing control system is configured to perform coordinated management on card operations on the multiple SIM cards for the multiple operating systems, and is further configured to perform a card operation on the first SIM card using the modem and according to the card operation request and a current status of the first SIM card, and send a first feedback result of the card operation to the first operating system and the second operating system. The first operating system is further configured to manage and monitor the current status of the first SIM card in the first operating system according to the first feedback result, and the second operating system is configured to manage and monitor the current status of the first SIM card in the second operating system according to the card operation request or the first feedback result.

With reference to the first aspect, in a first possible implementation manner, each of the first operating system and the second operating system includes a user interface (UI), UI processing unit, an upper-layer logic processing unit, and a resource management unit, where a UI processing unit in the first operating system is configured to receive the card operation request, and notify an upper-layer logic processing unit in a current operating system of the card operation request. The upper-layer logic processing unit in the first operating system is configured to notify a resource management unit in the first operating system of the card operation request. The resource management unit in the first operating system is configured to manage and monitor the current status of the first SIM card in the first operating system according to the card operation request, and notify the virtual resource sharing control system such that the virtual resource sharing control system performs a corresponding card operation according to the card operation request. The upper-layer logic processing unit in the first operating system is further configured to notify an upper-layer logic processing unit in the second operating system of the card operation request. The upper-layer logic processing unit in the second operating system is configured to notify a resource management unit in the second operating system of the card operation request. The resource management unit in the second operating system is configured to manage and monitor the current status of the first SIM card in the second operating system according to the card operation request. The resource management unit in the first operating system is further configured to receive the first feedback result, and manage and monitor the current status of the first SIM card in the first operating system according to the first feedback result, and the resource management unit in the second operating system is further configured to receive the first feedback result, and manage and monitor the current status of the first SIM card in the second operating system according to the the first feedback result.

With the first aspect or the first possible implementation manner of the first aspect, in a second possible implementation manner, specific implementation is the card operation, which includes a SIM card startup operation, a SIM card activation operation, a SIM card deactivation operation, or a SIM card switching operation.

With reference to the first aspect, in a third possible implementation manner, the modem is further configured to provide a channel resource for a data connection of the mobile terminal. The first operating system is further configured to receive a data service request of the user of the mobile terminal, and notify the second operating system and the virtual resource sharing control system of the data service request, where a new data connection needs to be established for the data service request. The virtual resource sharing control system is further configured to perform coordinated management on usage of the channel resource for the multiple operating systems, and is further configured to establish a data connection for the data service request according to the data service request and a current usage status of the channel resource in the modem, and send a second feedback result of data connection establishment to the first operating system and the second operating system. The first operating system is further configured to manage and monitor a usage status of the channel resource in the first operating system according to the second feedback result, and the second operating system is further configured to manage and monitor a usage status of the channel resource in the second operating system according to the data service request or the second feedback result.

With reference to the third possible implementation manner of the first aspect, in a fourth possible implementation manner, each of the first operating system and the second operating system includes a UI, UI processing unit, an upper-layer logic processing unit, and a resource management unit, where a UI processing unit in the first operating system is configured to receive the data service request, and notify an upper-layer logic processing unit in the current operating system of the data service request. The upper-layer logic processing unit in the first operating system is configured to notify a resource management unit in the first operating system of the data service request. The resource management unit in the first operating system is configured to manage and monitor the usage status of the channel resource in the first operating system according to the data service request, and notify the virtual resource sharing control system such that the virtual resource sharing control system allocates a corresponding channel resource to the data service request to establish the data connection. The upper-layer logic processing unit in the first operating system is further configured to notify an upper-layer logic processing unit in the second operating system of the data service request. The upper-layer logic processing unit in the second operating system is configured to notify a resource management unit in the second operating system of the data service request. The resource management unit in the second operating system is configured to manage and monitor the usage status of the channel resource in the second operating system according to the data service request. The resource management unit in the first operating system is further configured to receive the second feedback result, and manage and monitor the usage status of the channel resource in the first operating system according to the second feedback result, and the resource management unit in the second operating system is further configured to receive the second feedback result, and manage and monitor the usage status of the channel resource in the second operating system according to the second feedback result.

With reference to the third possible implementation manner of the first aspect or the fourth possible implementation manner of the first aspect, in a fifth possible implementation manner, in a process of establishing the data connection for the data service request according to the data service request and the current usage status of the channel resource in the modem, the virtual resource sharing control system is further configured to select a currently-used channel resource in the modem, disable a first data connection of the currently-used channel resource, and establish a second data connection for the data service request when no idle channel resource is in the modem, and the virtual resource sharing control system is further configured to release the second data connection, and restore the first data connection after a data service corresponding to the data service request is completed.

With reference to the third possible implementation manner of the first aspect or the fourth possible implementation manner of the first aspect, in a sixth possible implementation manner, in a process of establishing the data connection for the data service request according to the data service request and the current usage status of the channel resource in the modem, the virtual resource sharing control system is configured to select the idle channel resource to establish a second data connection for the data service request when an idle channel resource is in the modem, and the virtual resource sharing control system is further configured to release the second data connection after a service corresponding to the data service request is completed.

According to a second aspect, a mobile terminal is provided, the mobile terminal includes a virtual resource sharing control system, a modem, and multiple operating systems, the modem is configured to provide a channel resource for a data connection of the mobile terminal, a first operating system in the multiple operating systems is configured to receive a data service request of a user of the mobile terminal, and notify a second operating system in the multiple operating systems and the virtual resource sharing control system of the data service request, where a new data connection needs to be established for the data service request, the first operating system is an operating system that is in the multiple operating systems and that runs in foreground, and the second operating system is one or more operating systems, except the first operating system, in the multiple operating systems. The virtual resource sharing control system is configured to perform coordinated management on usage of the channel resource for the multiple operating systems, and configured to establish a data connection for the data service request according to the data service request and a current usage status of the channel resource in the modem, and send a feedback result of data connection establishment to the first operating system and the second operating system. The first operating system is further configured to manage and monitor a usage status of the channel resource in the first operating system according to the feedback result, and the second operating system is further configured to manage and monitor a usage status of the channel resource in the second operating system according to the data service request or the feedback result.

With reference to the second aspect, in a first possible implementation manner, each of the first operating system and the second operating system includes a UI, UI processing unit, an upper-layer logic processing unit, and a resource management unit, where a UI processing unit in the first operating system is configured to receive the data service request, and notify an upper-layer logic processing unit in the current operating system of the data service request. The upper-layer logic processing unit in the first operating system is configured to notify a resource management unit in the first operating system of the data service request. The resource management unit in the first operating system is configured to manage and monitor the usage status of the channel resource in the first operating system according to the data service request, and notify the virtual resource sharing control system such that the virtual resource sharing control system allocates a corresponding channel resource to the data service request to establish the data connection. The upper-layer logic processing unit in the first operating system is further configured to notify an upper-layer logic processing unit in the second operating system of the data service request. The upper-layer logic processing unit in the second operating system is configured to notify a resource management unit in the second operating system of the data service request. The resource management unit in the second operating system is configured to manage and monitor the usage status of the channel resource in the second operating system according to the data service request. The resource management unit in the first operating system is further configured to receive the second feedback result, and manage and monitor the usage status of the channel resource in the first operating system according to the second feedback result, and the resource management unit in the second operating system is further configured to receive the second feedback result, and manage and monitor the usage status of the channel resource in the second operating system according to the second feedback result.

With reference to the second aspect or the first possible implementation manner of the second aspect, in a second possible implementation manner, specific implementation includes, in a process of establishing the data connection for the data service request according to the data service request and the current usage status of the channel resource in the modem, the virtual resource sharing control system is configured to select a currently-used channel resource in the modem, disable a first data connection of the currently-used channel resource, and establish a second data connection for the data service request when no idle channel resource is in the modem, and the virtual resource sharing control system is further configured to release the second data connection, and restore the first data connection after a data service corresponding to the data service request is completed.

The second aspect or the first possible implementation manner of the second aspect, in a third possible implementation manner, in a process of establishing the data connection for the data service request according to the data service request and the current usage status of the channel resource in the modem, the virtual resource sharing control system is configured to select the idle channel resource to establish a second data connection for the data service request when an idle channel resource is in the modem, and the virtual resource sharing control system is further configured to release the second data connection after a service corresponding to the data service request is completed.

According to a third aspect, a resource management method of a mobile terminal is provided, the mobile terminal includes a virtual resource sharing control system, a modem, and multiple operating systems, and multiple SIM cards are deployed in the modem, and the method includes receiving, by a first operating system in the multiple operating systems, a card operation request of a user of the mobile terminal for a first SIM card in the multiple SIM cards, and notifying a second operating system in the multiple operating systems and the virtual resource sharing control system of the card operation request, where the first operating system is an operating system that is in the multiple operating systems and that runs in foreground, and the second operating system is one or more operating systems, except the first operating system, in the multiple operating systems, managing and monitoring, by the second operating system, a current status of the first SIM card in the second operating system according to the card operation request, performing, by the virtual resource sharing control system, a card operation on the first SIM card using the modem and according to the card operation request and the current status of the first SIM card, and sending a first feedback result of the card operation to the first operating system and the second operating system, managing and monitoring, by the first operating system, a current status of the first SIM card in the first operating system according to the first feedback result, and managing and monitoring, by the second operating system, the current status of the first SIM card in the second operating system according to the first feedback result.

According to a fourth aspect, a resource management method of a mobile terminal is provided, the mobile terminal includes a virtual resource sharing control system, a modem, and multiple operating systems, the modem is configured to provide a channel resource for a data connection of the mobile terminal, and the method includes receiving, by a first operating system in the multiple operating systems, a data service request of a user of the mobile terminal, and notifying a second operating system in the multiple operating systems and the virtual resource sharing control system of the data service request, where a new data connection needs to be established for the data service request, the first operating system is an operating system that is in the multiple operating systems and that runs in foreground, and the second operating system is one or more operating systems, except the first operating system, in the multiple operating systems, managing and monitoring, by the second operating system, a usage status of a channel resource in the second operating system according to the data service request, establishing, by the virtual resource sharing control system, a data connection for the data service request according to the data service request and a current usage status of the channel resource in the modem, and sending a feedback result of data connection establishment to the first operating system and the second operating system, managing and monitoring, by the first operating system, a usage status of a channel resource in the first operating system according to the feedback result, and managing and monitoring, by the second operating system, the usage status of the channel resource in the second operating system according to the feedback result.

Based on the first aspect, the third aspect, and expanded technical solutions thereof, according to the mobile terminal and the resource management method of the mobile terminal in the embodiments of the present disclosure, in addition to multiple operating systems, a virtual resource sharing control system is set in the mobile terminal in order to manage multiple SIM card resources in a modem for all the operating systems, when a first operating system (an operating system running in foreground) performs an operation on a resource in the modem, notify a second operating system (an operating system except the first operating system), and after the operation is completed, notify all the operating systems using the virtual resource sharing control system. In this way, each operating system of the mobile terminal monitors and manages usage statuses of the multiple SIM card resources of the mobile terminal in a real time manner, consistency ensured in the usage statuses of the multiple SIM card resources in the mobile terminal, and the mobile terminal implements coordinated management of the multiple SIM card resources in the multiple operating systems.

Based on the second aspect, the fourth aspect, and expanded technical solutions thereof, according to the other mobile terminal and the other resource management method of the mobile terminal in the embodiments of the present disclosure, in addition to multiple operating systems, a virtual resource sharing control system is set in the mobile terminal in order to manage a channel resource in a modem for all the operating systems, when a first operating system (an operating system running in foreground) performs an operation on a resource in the modem, notify a second operating system (an operating system except the first operating system), and after the operation is completed, notify all the operating systems using the virtual resource sharing control system. In this way, each operating system of the mobile terminal monitors and manages a usage status of the channel resource of the mobile terminal in a real time manner, consistency is ensured in the usage statuses of the channel resource in the mobile terminal, and the mobile terminal implements coordinated management of the channel resource in the multiple operating systems.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions in the embodiments of the present disclosure may be applied to various mobile terminals. A mobile terminal may be referred to as user equipment (UE), a user, or the like, and may communicate with one or more core networks using a radio access network (RAN). The mobile terminal may be a mobile telephone (or referred to as a "cellular" telephone) and a computer with a mobile terminal, for example, may be a portable, pocket-sized, handheld, computer built-in, or in-vehicle mobile apparatus. The mobile terminals exchange language and/or data with the radio access network, for example, may be a mobile phone, an in-vehicle mobile apparatus, a personal digital assistant PDA, or the like.

Figure 1:
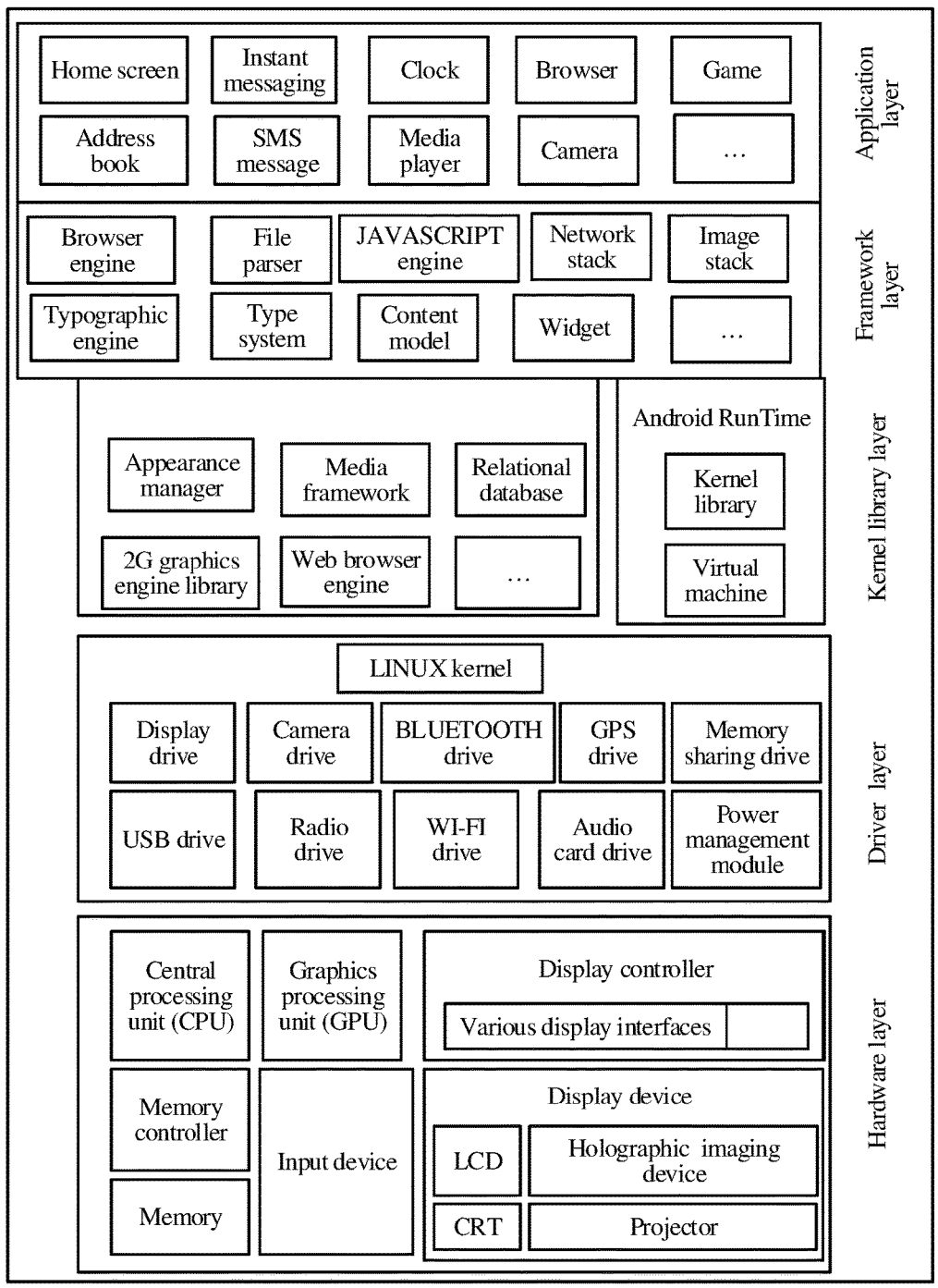
FIG. 1 is a schematic diagram of an embodiment of a system architecture of a mobile terminal according to an embodiment of the present disclosure.
Figure 2:
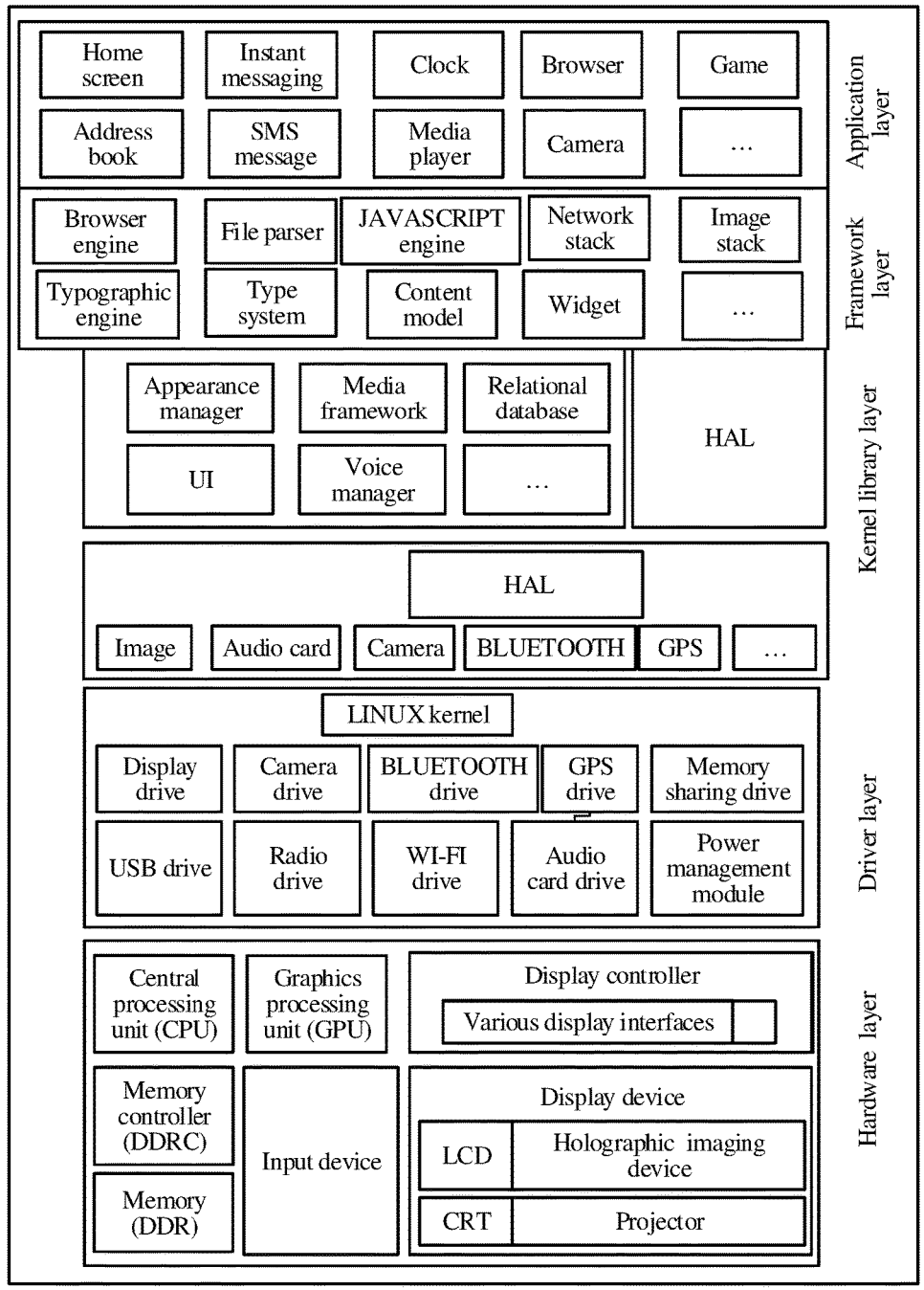
FIG. 2 is a schematic diagram of another embodiment of a system architecture of a mobile terminal according to an embodiment of the present disclosure.

Referring to FIG. 1 and FIG. 2, both FIG. 1 and FIG. 2 are schematic structural diagrams of a mobile terminal according to embodiments of the present disclosure.

FIG. 1 and FIG. 2 are used as examples to describe a logical structure of a compute node applied in an application scenario identification method or a power consumption management method provided in the embodiments of the present disclosure. The compute node may be a mobile terminal, and the mobile terminal may be further a smartphone. As shown in FIG. 1 and FIG. 2, a hardware layer of the mobile terminal includes a central processing unit (CPU), a graphics processing unit (GPU), and the like. Certainly, the hardware layer may further include a memory, input/output devices, a memory, a memory controller, a network interface, and the like. An input device may include a keyboard, a mouse, a touchscreen, and the like, and an output device may include a display device such as a liquid crystal display (LCD), a cathode ray tube (CRT), a holographic imaging device, a projector, and the like. An operating system (for example, ANDROID and FIREFOX operating system) and some application programs may run on the hardware layer.

An ANDROID system is used as an example in FIG. 1 to describe a software system architecture of the mobile terminal. A kernel library layer is a core part of an operating system and includes an appearance manager, a media framework, a relational database, a second generation (2G) graphics engine library, a Web browser engine, a kernel library, a virtual machine (for example, a Dalvik Virtual Machine), and the like. Identification of an application scenario and determining of a power consumption control policy that are described in the embodiments of the present disclosure may be implemented in the virtual machine (for example, the Dalvik Virtual Machine). That is, the virtual machine analyzes, by means of compilation, an application program that is running on the mobile terminal, and obtains feature data of the application program, and determines, from a scenario feature data set according to the feature data of the application program, application scenario information corresponding to the feature data of the application program. The scenario feature data set includes a correspondence between multiple types of application scenario information and feature data of multiple application programs, and the application scenario information corresponding to the feature data of the application program is used to indicate an application scenario in which the mobile terminal is currently used. The virtual machine determines, from a control policy set according to the application scenario information, a power consumption control policy corresponding to the application scenario information. The control policy set includes a correspondence between the multiple types of application scenario information and multiple power consumption control policies. The virtual machine generates a corresponding power consumption control instruction according to the power consumption control policy corresponding to the application scenario information, and transmits the power consumption control instruction to a kernel (that is, a LINUX kernel in FIG. 1) such that the kernel performs power consumption control on corresponding hardware (for example, a CPU, a GPU, or a display device) of the mobile terminal.

In addition, the mobile terminal further includes a driver layer, a framework layer, and an application layer. The driver layer may include a CPU drive, a GPU drive, a display controller drive, and the like. The framework layer may include a browser engine, a typographic engine, a file parser, and the like. The application layer may include multiple application programs such as a home screen, a media player, and a browser.

A FIREFOX operating system is used as an example in FIG. 2 to describe a software system architecture of the mobile terminal. A kernel library layer is a core part of an operating system and includes an appearance manager, a media framework, a relational database, a UI, a voice manager, and the like.

In addition to a kernel library layer and a hardware layer, the mobile terminal further includes a driver layer, a framework layer, and an application layer. The driver layer may include a CPU drive, a GPU drive, a display controller drive, and the like.

The framework layer may include a browser engine, a typographic engine, a file parser, a JAVASCRIPT engine, and the like. Identification of an application scenario and determining of a power consumption control policy that are described in the embodiments of the present disclosure may be implemented in the JAVASCRIPT engine. That is, the JAVASCRIPT engine analyzes, by means of compilation, an application program that is running on the mobile terminal, and obtains feature data of the application program, and determines, from a scenario feature data set according to the feature data of the application program, application scenario information corresponding to the feature data of the application program. The scenario feature data set includes a correspondence between multiple types of application scenario information and feature data of multiple application programs, and the application scenario information corresponding to the feature data of the application program is used to indicate an application scenario in which the mobile terminal is currently used. The JAVASCRIPT engine determines, from a control policy set according to the application scenario information, a power consumption control policy corresponding to the application scenario information. The control policy set includes a correspondence between the multiple types of application scenario information and multiple power consumption control policies. The JAVASCRIPT engine generates a corresponding power consumption control instruction according to the power consumption control policy corresponding to the application scenario information, and transmits the power consumption control instruction to a kernel (that is, a LINUX kernel in FIG. 2) such that the kernel performs power consumption control on corresponding hardware (for example, a CPU, a GPU, or a display device) of the mobile terminal.

The application layer may include multiple application programs such as a home screen, a media player, and a browser.

An existing mobile terminal with multiple operating systems can support dual SIM cards, but cannot manage dual SIM card resources.

Figure 3:
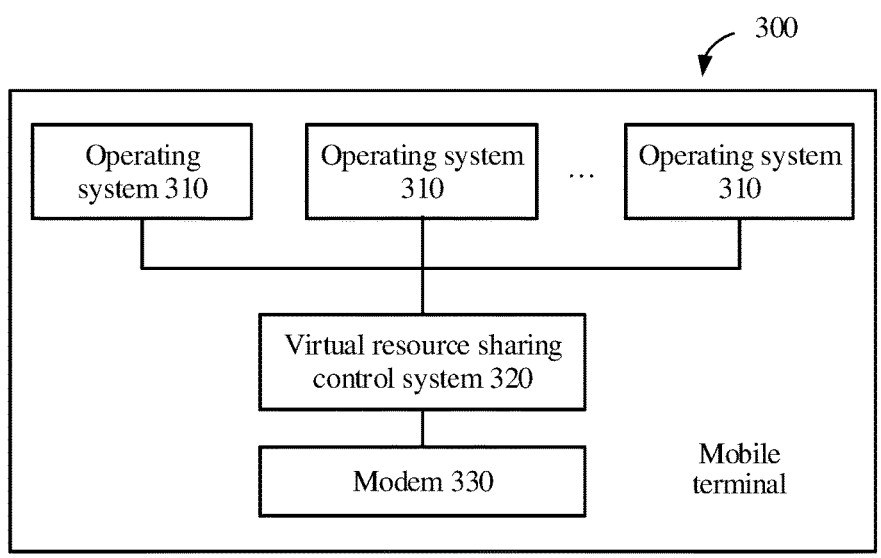
FIG. 3 is a schematic structural diagram of a mobile terminal according to an embodiment of the present disclosure.

According to the mobile terminal with the multiple systems in the embodiments of the present disclosure, the foregoing problem can be resolved to some extent. FIG. 3 is a schematic structural diagram of a mobile terminal 300 according to an embodiment of the present disclosure. As shown in FIG. 3, the mobile terminal 300 may include multiple operating systems 310, a virtual resource sharing control system 320, and a modem 330.

Multiple SIM cards are deployed in the modem 330.

A SIM card may also be referred to as a user identification card, a smart card, and the like. Certainly, the SIM card may further be another type of card that is in a mobile terminal and that is configured to provide a mobile service, which is not limited in this embodiment of the present disclosure.

A first operating system in the multiple operating systems 310 is configured to receive a card operation request of a user of the mobile terminal 300 for a first SIM card in the multiple SIM cards, and notify a second operating system in the multiple operating systems 310 and the virtual resource sharing control system 320 of the card operation request.

The first operating system is an operating system that is in the multiple operating systems 310 and that runs in foreground. The second operating system is one or more operating systems, except the first operating system, in the multiple operating systems 310, or the second operating system is all other operating systems, except the first operating system, in the multiple operating systems 310.

It should be understood that, when the mobile terminal 300 is in an operating state, multiple operating systems 310 running on the mobile terminal 300 may be classified into an operating system running in foreground and an operating system running in background. There may be more than one operating system running in foreground. Obviously, the user of the mobile terminal 300 generally performs an operation only in the operating system running in foreground. After receiving the card operation request, the first operating system may send the card operation request to another operating system, including the operating system running in background and another operating system running in foreground.

The virtual resource sharing control system 320 is configured to perform coordinated management on card operations on the multiple SIM cards for the multiple operating systems 310. Further, the virtual resource sharing control system 320 may be configured to perform a card operation on the first SIM card using the modem 330 and according to the card operation request and a current status of the first SIM card, and send a first feedback result of the card operation to the first operating system and the second operating system.

The first operating system is further configured to manage and monitor the current status of the first SIM card in the first operating system according to the first feedback result.

The second operating system is configured to manage and monitor the current status of the first SIM card in the second operating system according to the card operation request or the first feedback result.

In this embodiment of the present disclosure, in addition to multiple operating systems 310, a virtual resource sharing control system 320 is set in a mobile terminal 300 in order to perform coordinated management on multiple SIM card resources in a modem for all the operating systems, notify another operating system when an operating system running in foreground performs an operation on the SIM card resources, and after the operation is completed, notify all the operating systems using the virtual resource sharing control system. In this way, each operating system of the mobile terminal 300 monitors and manages usage statuses of the multiple SIM card resources of the mobile terminal 300 in a real time manner, consistency is ensured in the usage statuses of the multiple SIM card resources in the mobile terminal 300, and the mobile terminal 300 implements coordinated management of the multiple SIM card resources in the multiple operating systems 310.

Optionally, the card operation may include a SIM card startup operation, a SIM card activation operation, a SIM card deactivation operation, or a SIM card switching operation.

Figure 4:
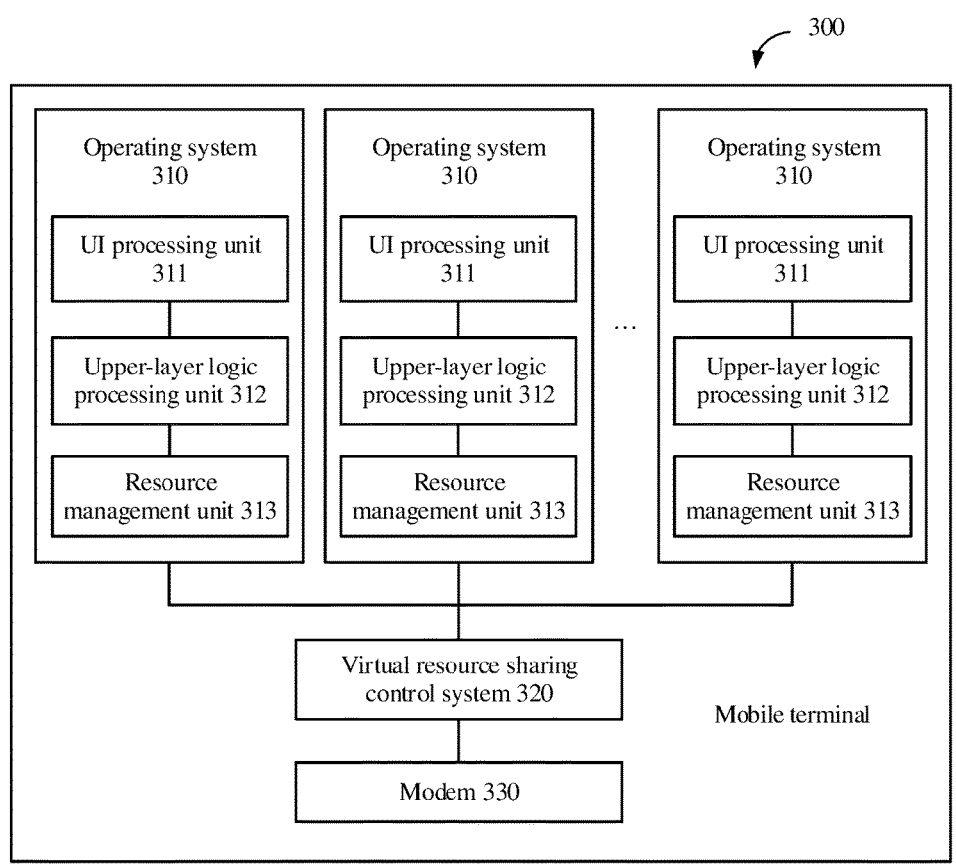
FIG. 4 is another schematic structural diagram of a mobile terminal according to an embodiment of the present disclosure.

FIG. 4 is another schematic structural diagram of a mobile terminal 300 according to an embodiment of the present disclosure. Optionally, as shown in FIG. 4, with reference to FIG. 3, each one of the multiple operating systems 310 may further include a UI processing unit 311, an upper-layer logic processing unit 312, and a resource management unit 313. During management of the multiple SIM cards, UI, UI processing units 311, upper-layer logic processing units 312, and resource management units 313 may be configured to implement the following functions.

A UI processing unit 311 in the first operating system is configured to receive the card operation request, and notify an upper-layer logic processing unit 312 in the current operating system of the card operation request. The upper-layer logic processing unit 312 in the first operating system is configured to notify a resource management unit 313 in the first operating system of the card operation request. The resource management unit 313 in the first operating system is configured to manage and monitor the current status of the first SIM card in the first operating system according to the card operation request, and notify the virtual resource sharing control system 320 such that the virtual resource sharing control system 320 performs a corresponding card operation according to the card operation request. The upper-layer logic processing unit 312 in the first operating system is further configured to notify an upper-layer logic processing unit 312 in the second operating system of the card operation request. The upper-layer logic processing unit 312 in the second operating system is configured to notify a resource management unit 313 in the second operating system of the card operation request. The resource management unit 313 in the second operating system is configured to manage and monitor the current status of the first SIM card in the second operating system according to the card operation request. The resource management unit 313 in the first operating system is further configured to receive the first feedback result, and manage and monitor the current status of the first SIM card in the first operating system according to the first feedback result, and the resource management unit 313 in the second operating system is further configured to receive the first feedback result, and manage and monitor the current status of the first SIM card in the second operating system according to the first feedback result.

Optionally, in another embodiment, the modem 330 is further configured to provide a channel resource for a data connection of the mobile terminal 300. The first operating system is further configured to receive a data service request of the user of the mobile terminal 300, and notify the second operating system and the virtual resource sharing control system 320 of the data service request, where a new data connection needs to be established for the data service request. The virtual resource sharing control system 320 is further configured to perform coordinated management on usage of the channel resource for the multiple operating systems 310, and further configured to establish a data connection for the data service request according to the data service request and a current usage status of the channel resource in the modem 330, and send a second feedback result of data connection establishment to the first operating system and the second operating system. The first operating system is further configured to manage and monitor a usage status of the channel resource in the first operating system according to the second feedback result. The second operating system is further configured to manage and monitor a usage status of the channel resource in the second operating system according to the data service request or the second feedback result.

It should be understood that a usage status of a channel resource may include whether the channel resource is used, an operating system that is using the channel resource, whether a data connection is already established, or the like. Certainly, the usage status of the channel resource may further include other information related to channel resource usage, which is not described in this embodiment of the present disclosure.

In this embodiment of the present disclosure, another operating system is notified when an operating system running in foreground requests a channel resource, and the multiple operating systems 310 are notified using a virtual resource sharing control system 320 after an operation (including channel resource allocation and channel resource release) is completed. In this way, each operating system of the mobile terminal 300 monitors and manages a usage status of the channel resource of the mobile terminal 300 in a real time manner, consistency is ensured in the usage statuses of the channel resource in the mobile terminal 300, and the mobile terminal 300 implements coordinated management of the channel resource in the multiple operating systems 310.

Further, in a current embodiment, during management of concurrent connections of multiple services, the UI, UI processing units 311, the upper-layer logic processing units 312, and the resource management units 313 may be further configured to implement the following functions.

A UI processing unit 311 in the first operating system is configured to receive the data service request, and notify an upper-layer logic processing unit 312 in the current operating system of the data service request. The upper-layer logic processing unit 312 in the first operating system is configured to notify a resource management unit 313 in the first operating system of the data service request. The resource management unit 313 in the first operating system is configured to manage and monitor the usage status of the channel resource in the first operating system according to the data service request, and notify the virtual resource sharing control system 320 such that the virtual resource sharing control system 320 allocates a corresponding channel resource to the data service request to establish the data connection. The upper-layer logic processing unit 312 in the first operating system is further configured to notify an upper-layer logic processing unit 312 in the second operating system of the data service request. The upper-layer logic processing unit 312 in the second operating system is configured to notify a resource management unit 313 in the second operating system of the data service request. The resource management unit 313 in the second operating system is configured to manage and monitor the usage status of the channel resource in the second operating system according to the data service request. The resource management unit 313 in the first operating system is further configured to receive the second feedback result, and manage and monitor the usage status of the channel resource in the first operating system according to the second feedback result, and the resource management unit 313 in the second operating system is further configured to receive the second feedback result, and manage and monitor the usage status of the channel resource in the second operating system according to the second feedback result.

Optionally, in a specific application of the current embodiment, in a process of establishing the data connection for the data service request according to the data service request and the current usage status of the channel resource in the modem 330, the virtual resource sharing control system 320 is further configured to select a currently-used channel resource in the modem 330, disable a first data connection of the currently-used channel resource, and establish a second data connection for the data service request when no idle channel resource is in the modem 330. In addition, the virtual resource sharing control system 320 is further configured to release the second data connection, and restore the first data connection after a data service corresponding to the data service request is completed.

Optionally, in another specific application of the current embodiment, in a process of establishing the data connection for the data service request according to the data service request and the current usage status of the channel resource in the modem 330, the virtual resource sharing control system 320 is further configured to select the idle channel resource to establish a second data connection for the data service request when an idle channel resource is in the modem 330. In addition, the virtual resource sharing control system 320 is further configured to release the second data connection after a service corresponding to the data service request is completed.

It should be understood that, when the channel resource in the modem 330 is a single-channel resource, and the single-channel resource is not used, the virtual resource sharing control system 320 may directly establish, on the single-channel resource, the second data connection corresponding to the service request. Alternatively, when the channel resource in the modem 330 is a multi-channel resource, and a current channel resource of the first operating system can meet the service request, the virtual resource sharing control system 320 may establish, on the current channel resource of the first operating system, the second data connection corresponding to the service request. For specific implementation, reference may be made to the other approaches. The details are not described in this embodiment of the present disclosure.

Figure 5:
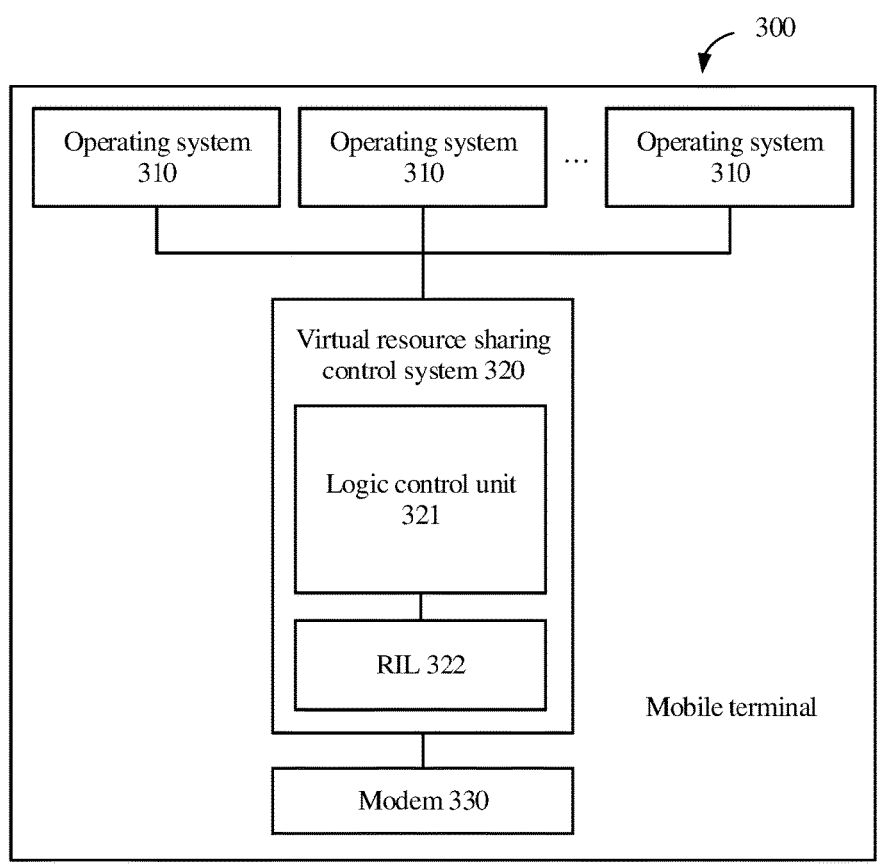
FIG. 5 is still another schematic structural diagram of a mobile terminal according to an embodiment of the present disclosure.

FIG. 5 is another schematic structural diagram of a mobile terminal 300 according to an embodiment of the present disclosure. Optionally, as shown in FIG. 5, with reference to the FIG. 3, a virtual resource sharing control system 320 may include a logic control unit 321 for sharing and accessing an underlying protocol resource and a radio interface layer (RIL) 322.

The logic control unit 321 for sharing and accessing an underlying protocol resource may be configured to provide a unified interface for sharing and accessing an underlying protocol resource for the multiple operating systems 310, and the RIL 322 is configured to implement an access interface with an entity device, such as the modem 330. For example, during a card operation on a SIM card, the logic control unit 321 for sharing and accessing an underlying protocol resource provides, for the multiple operating systems 310, an interface on which card operations are performed on SIM cards in the modem 330 in order to perform coordinated management on the card operations on the SIM cards in the modem 330 for the multiple operating systems 310, and implement the card operations on the SIM cards in the modem 330 using the RIL 322.

Certainly, it should be understood that, in specific implementation, a logical unit in the embodiments shown in the foregoing FIG. 3 to FIG. 5 may be a functional module. For example, a UI processing module may implement a logical function of a UI processing unit 311, an upper-layer logic processing module may implement a logical function of an upper-layer logic processing unit 312, a resource management module may implement a logical function of a resource management unit 313, a logic control module for sharing and accessing an underlying protocol resource may implement a logical function of a logic control unit 321 for sharing and accessing an underlying protocol resource, and so on. Details are not described in this embodiment of the present disclosure.

The following further describes the method in the embodiments of the present disclosure with reference to specific embodiments.

Figure 6:
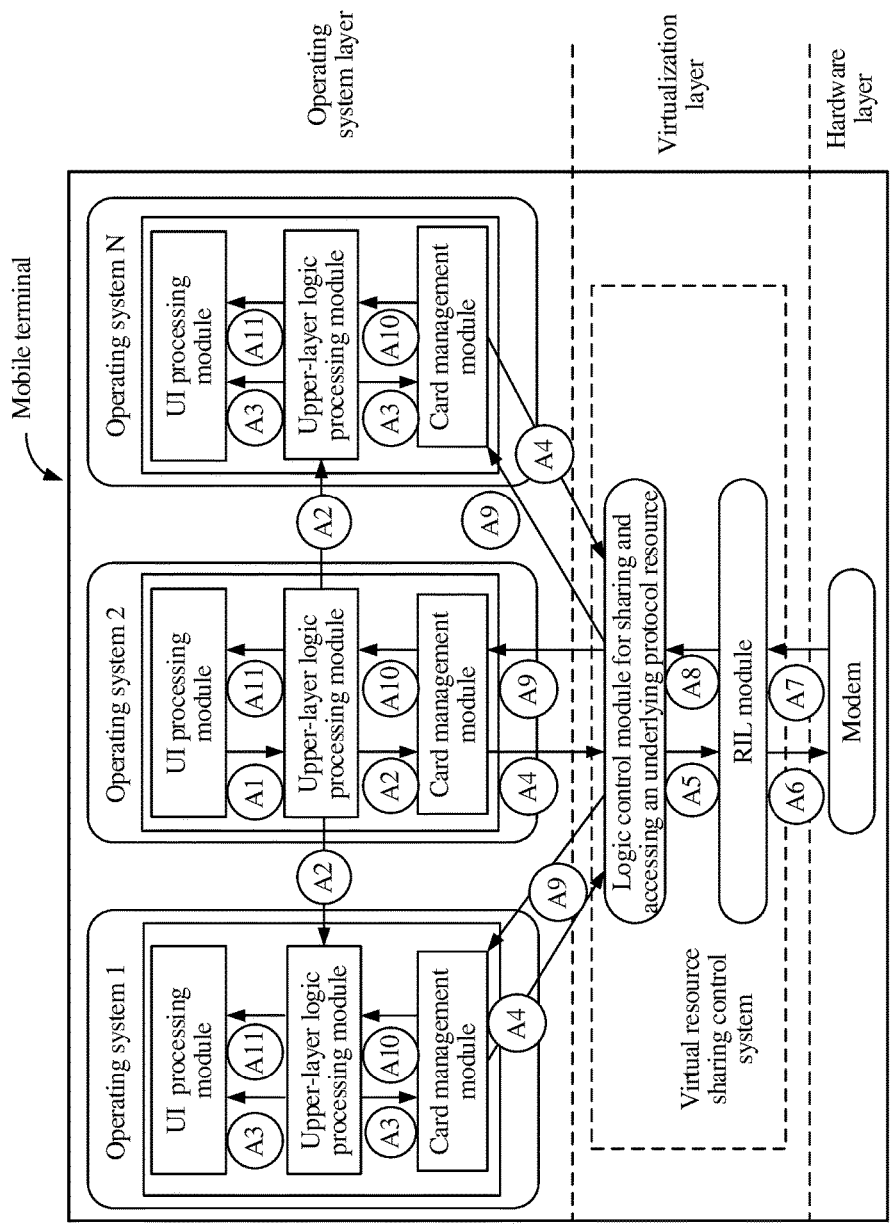
FIG. 6 is a schematic flowchart of management of dual SIM card resources in a mobile terminal according to an embodiment of the present disclosure.

FIG. 6 is a schematic flowchart of management of dual SIM card resources in a mobile terminal according to an embodiment of the present disclosure. In FIG. 6, the mobile terminal may include three layers, multiple operating systems such as an operating system 1, an operating system 2, . . . , and an operating system N at an operating system layer, a virtual resource sharing control system at a virtualization layer, a modem and the like at a hardware layer. The operating system 1, the operating system 2, . . . , and the operating system N are equivalent to the operating systems 310 in the embodiments shown in FIG. 3 to FIG. 5, the virtual resource sharing control system is equivalent to the virtual resource sharing control system 320 in the embodiments shown in FIG. 3 to FIG. 5, and the modem is equivalent to the modem 330 in the embodiments shown in FIG. 3 to FIG. 5. SIM cards of the mobile terminal are in the modem, and the mobile terminal implements a startup operation, a card switching operation, an activation operation, a deactivation operation, and the like on multiple SIM cards using the modem.

In addition, each operating system may include a UI processing module, an upper-layer logic processing module, and a card management module. A UI processing module may be configured to display current usage statuses of SIM card resources of the mobile terminal to a user, and send a card operation request of the user to an upper-layer logic processing module in a current operating system in which the UI processing module is located. The upper-layer logic processing module may be configured to forward a message from a UI display interface module in the current operating system to a card management module in another operating system, or forward a message from a card management module in the current operating system to the UI processing module in the current operating system, or forward a message from an upper-layer logic processing module in another operating system to a UI display interface module in the current operating system and a card management module in the current operating system. A card management module may record current usage statuses of SIM card resources in the current operating system, and further configured to refresh the current usage statuses of the SIM card resources in the current operating system according to a message of the current operating system, or refresh the current usage statuses of the SIM card resources in the current operating system according to a card operation result fed back by the virtualization layer.

In addition, the virtualization layer may further include a logic control module for sharing and accessing an underlying protocol resource and a RIL module. The logic control module for sharing and accessing an underlying protocol resource is configured to provide a unified interface for sharing and accessing an underlying protocol resource for all the operating systems, and a RIL is configured to implement an access interface with an entity device, the modem. Further, the logic control module for sharing and accessing an underlying protocol resource may determine card operations on SIM cards according to card operation requests of all the operating systems and with reference to current usage statuses of the SIM card resources, and perform operations on SIM cards in the modem using the RIL. In addition, the logic control module for sharing and accessing an underlying protocol resource may further forward, to each operating system, a result fed back by the modem using the RIL.

Certainly, it should be understood that, in practical application, an operating system or a virtualization layer may have different functions, but the operating system can implement functions in the embodiments shown in FIG. 3 to FIG. 5.

In addition, in FIG. 6, circle symbols are configured to indicate step numbers of arrows on the right of the circles or arrows in which the circles are located. A card deactivation operation is used as an example in this embodiment of the present disclosure for description, and a specific procedure for implementing the card deactivation operation by the mobile terminal is as follows.

Step A1: A user performs an interface operation to generate a card operation request for managing a card.

In this embodiment of the present disclosure, the operating system 2 is an operating system running in foreground in the mobile terminal. The modem includes multiple SIM card resources. The card operation request for managing a card is generated when the user performs an operation in the UI processing module, and the card operation request is assumed as an operation request for deactivating a first SIM card.

Step A2: After receiving the card operation request, an upper-layer logic processing module in the operating system 2 notifies another operating system of the card operation request, and also notifies a card management module in the operating system 2.

After receiving the card operation request for deactivation, the card management module in the operating system 2 may refresh usage statuses of SIM card resources in the operating system 2 according to the card operation request.

Further, the card management module in the operating system 2 may mark the state of the first SIM card as "to be deactivated".

The upper-layer logic processing module in the operating system 2 may further send the card operation request to an upper-layer logic processing module in the other operating system. The other operating system may include an operating system running in background and another operating system running in foreground in the mobile terminal. Certainly, in specific application, the mobile terminal may have only one operating system running in foreground.

Step A3: After receiving a message about the card operation request of the operating system 2, an upper-layer logic processing module in the other operating system instructs a UI processing module in the other operating system to perform corresponding processing, and also notifies a card management module in the other operating system.

Further, the upper-layer logic processing module in the other operating system may instruct the UI processing module in the other operating system to refresh display of usage statuses of the SIM card resources, and instruct the card management module in the other operating system to update a record about the usage statuses of the SIM card resources.

It is assumed that the operating system 1 is also one of operating systems running in foreground, and the operating system N is one of operating systems running in background. An upper-layer logic processing module in each of the operating system 1 and the operating system N may instruct, according to an operation for deactivating the first SIM card by the operating system 2, a UI processing module in each of the operating system 1 and the operating system N to display a state in which the first SIM card is being deactivated, and the like. In addition, the upper-layer logic processing module in each of the operating system 1 and the operating system N further notifies a card management module in each of the operating system 1 and the operating system N such that the card management module in each of the operating system 1 and the operating system N changes a state record of the first SIM card into the state of "being deactivated".

Certainly, it should be understood that, when the operating system 2 is the operating system running in foreground, the other operating system may be an operating system running in background.

Step A4: The card management module in each operating system sends a message to the logic control module for sharing and accessing an underlying protocol resource.

Further, for example, the card management module in the operating system 2 may send, to the logic control module for sharing and accessing an underlying protocol resource, a message for performing a deactivation operation on the first SIM card, the other operating system such as the operating system 1 or the operating system N sends current usage information of the SIM card resources to the logic control module for sharing and accessing an underlying protocol resource, and the like.

Step A5: After completing processing messages of all the operating systems, the logic control module for sharing and accessing an underlying protocol resource instructs the RIL module to perform a card operation.

The logic control module for sharing and accessing an underlying protocol resource coordinates card operations on all the operating systems according to the messages of all the operating systems, notifies the RIL module, and sends a card operation instruction to the modem using the RIL module.

For example, in this embodiment of the present disclosure, the logic control module for sharing and accessing an underlying protocol resource may send the card operation instruction to the modem using the RIL module in order to instruct the modem to perform the deactivation operation on the first SIM card.

Step A6: The RIL module instructs the modem to perform the card operation.

Step A7: After successfully performing the card operation, the modem notifies the RIL module.

The modem completes the card operation according to the instruction of the RIL module, and feeds back a result of the card operation to the RIL module.

Further, the result of the card operation may include a successful operation and a failed operation. Generally, the card operation always succeeds.

For example, in this embodiment of the present disclosure, the card operation succeeds.

In this case, the modem may feedback, to the RIL module, a result in which the first SIM card is successfully deactivated.

Step A8: The RIL module returns a message to the logic control module for sharing and accessing an underlying protocol resource.

The RIL module returns, to the logic control module for sharing and accessing an underlying protocol resource, the message fed back by the modem such that the logic control module for sharing and accessing an underlying protocol resource performs corresponding logical processing.

Step A9: After performing logical processing, the logic control module for sharing and accessing an underlying protocol resource notifies each operating system.

Further, the logic control module for sharing and accessing an underlying protocol resource may perform coordinated management on the SIM card resources in the modem according to the result fed back by the RIL module and current statuses that are of the SIM card resources in the modem and that are recorded in the logic control module for sharing and accessing an underlying protocol resource.

For example, in this embodiment of the present disclosure, the logic control module for sharing and accessing an underlying protocol resource may change the state of the first SIM card into an inactive state according to the feedback result in which the first SIM card is successfully deactivated, and then returns, to the card management module in each operating system, state information of the first SIM card or the feedback result in which the first SIM card is successfully deactivated.

Step A10: The card management module in each operating system returns a result to the upper-layer logic processing module in each operating system.

The card management module in each operating system may change the state of the first SIM card in each operating system into an inactive state, and then return the feedback result to the upper-layer logic processing module in each operating system such that the upper-layer logic processing module in each operating system refreshes the state of the first SIM card using the UI processing module in each operating system.

Step A11: The upper-layer logic processing module instructs a UI processing module in each operating system to refresh a result.

The upper-layer logics processing module in each operating system instructs the UI processing module in each operating system to refresh the state of the SIM card (i.e. the first SIM card). In this case, in this embodiment of the present disclosure, the UI processing module in each operating system may display the inactive state of the first SIM card.

In this embodiment of the present disclosure, all operating systems notify each other when performing card operations, and a virtualization layer performs unified management on card operations on multiple SIM cards of a mobile terminal, and feeds back an operation result to each operating system. In this way, each operating system of the mobile terminal monitors and manages usage statuses of multiple SIM card resources of the mobile terminal in a real time manner, consistency is ensured in the usage statuses of the multiple SIM card resources in the mobile terminal, and the mobile terminal implements coordinated management of the multiple SIM card resources in the multiple operating systems.

Figure 7:
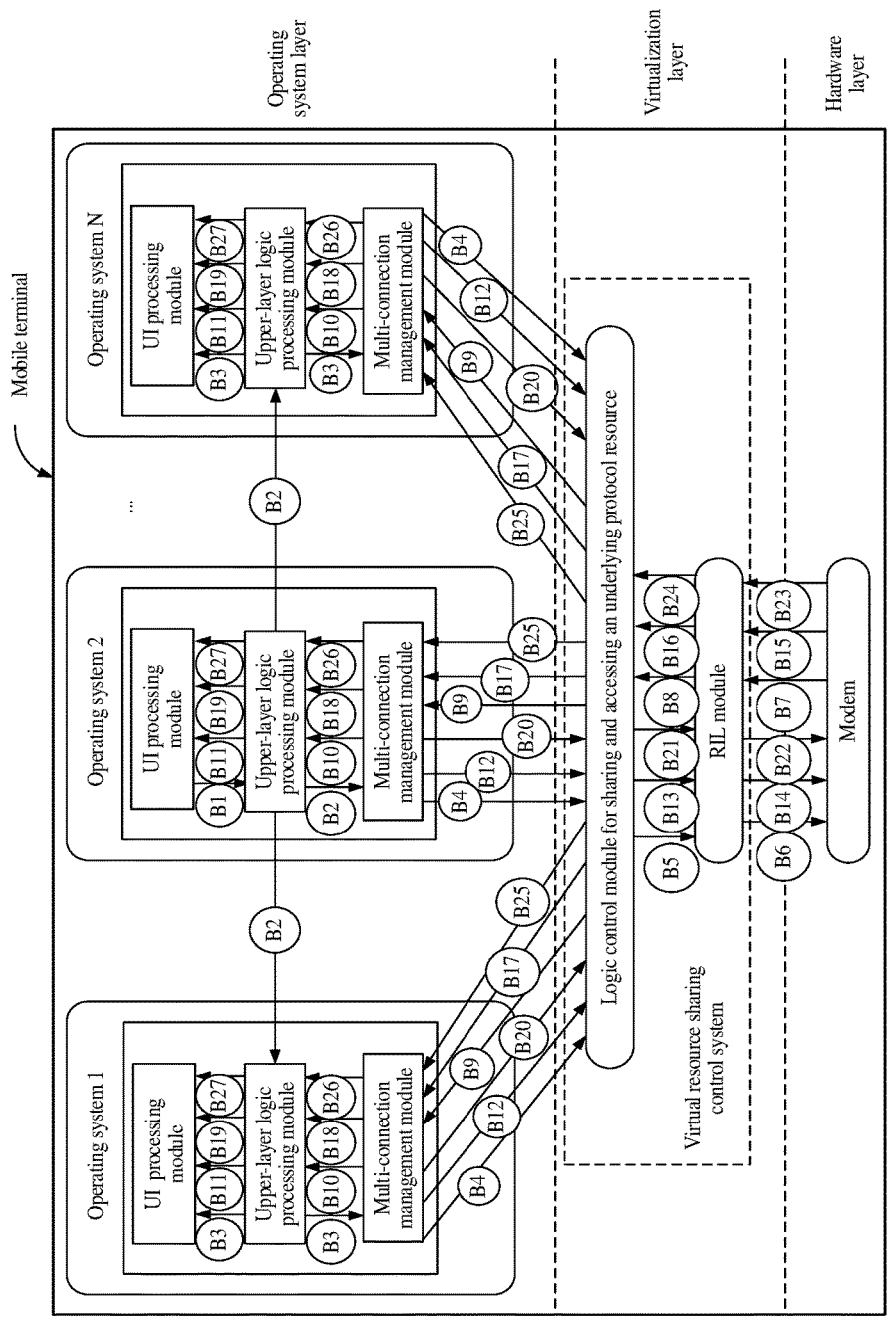
FIG. 7 is a schematic flowchart of concurrent management of multiple data services in a mobile terminal according to an embodiment of the present disclosure.

FIG. 7 is a schematic flowchart of concurrent management of multiple data services in a mobile terminal according to an embodiment of the present disclosure. In FIG. 7, the mobile terminal may include three layers, multiple operating systems such as an operating system 1, an operating system 2, . . . , and an operating system N at an operating system layer, a virtual resource sharing control system at a virtualization layer, a modem and the like at a hardware layer. The operating system 1, the operating system 2, . . . , and the operating system N are equivalent to the operating systems 310 in the embodiments shown in FIG. 3 to FIG. 5, the virtual resource sharing control system is equivalent to the virtual resource sharing control system 320 in the embodiments shown in FIG. 3 to FIG. 5, and the modem is equivalent to the modem 330 in the embodiments shown in FIG. 3 to FIG. 5. The modem may be configured to provide a data connection resource for the mobile terminal. In this embodiment of the present disclosure, a channel resource that can be provided by the modem is a single-channel resource.

In addition, each operating system may include a UI processing module, an upper-layer logic processing module, and a multi-connection management module. A UI processing module may be configured to display a current usage status of a channel resource of the mobile terminal to a user, and send a data service request of the user to an upper-layer logic processing module in a current operating system in which the UI processing module is located. The upper-layer logic processing module may be configured to forward a message from a UI display interface module in the current operating system to the upper-layer logic processing module in the current operating system and a multi-connection management module in another operating system, or forward a message from a multi-connection management module in the current operating system to the UI processing module in the current operating system, or forward a message from an upper-layer logic processing module in another operating system to a UI display interface module in the current operating system and a multi-connection management module in the current operating system. The multi-connection management module may record a current usage status of a channel resource in the current operating system, and is further configured to refresh the current usage status of the channel resource in the current operating system according to a message of the current operating system, or refresh the current usage status of the channel resource in the current operating system according to a channel resource usage result fed back by the virtualization layer.

It should be understood that a usage status of a channel resource may include whether the channel resource is used, an operating system that is using the channel resource, whether a data connection is already established, or the like.

Certainly, the usage status of the channel resource may further include other information related to channel resource usage, which is not described in this embodiment of the present disclosure.

In addition, the virtualization layer may further include a logic control module for sharing and accessing an underlying protocol resource and a RIL module. The logic control module for sharing and accessing an underlying protocol resource is configured to provide a unified interface for sharing and accessing an underlying protocol resource for all the operating systems, and a RIL is configured to implement an access interface with an entity device, the modem. Further, the logic control module for sharing and accessing an underlying protocol resource may determine channel resource allocation according to data service requests of all the operating systems and with reference to the current usage status of the channel resource, and allocate the channel resource in the modem using the RIL. In addition, the logic control module for sharing and accessing an underlying protocol resource may further forward, to each operating system, a result fed back by the modem using the RIL. Further, in this embodiment of the present disclosure, the channel resource allocation may include data connection establishment and data connection release in the channel resource.

Certainly, it should be understood that, in practical application, an operating system or a virtualization layer may have different functions, but the operating system can implement functions in the embodiments shown in FIG. 3 to FIG. 5.

In addition, in FIG. 7, circle symbols are configured to indicate step numbers of arrows on the right of the circles or arrows in which the circles are located. A multimedia messaging service is used as an example in this embodiment of the present disclosure for description, and a specific procedure for implementing the concurrent management of the multiple data services by the mobile terminal is as follows.

Step B1: A user performs an interface operation to generate a data service request for establishing a new data connection.

In this embodiment of the present disclosure, the operating system 2 is an operating system running in foreground in the mobile terminal, the single-channel resource in the modem is already used, and there is a data connection.

It is assumed that the data service request for establishing a new data connection is a multimedia messaging service request, and the multimedia messaging service request needs a channel resource to establish a data connection for data transmission.

Step B2: After receiving the data service request, an upper-layer logic processing module in the operating system 2 notifies another operating system of the data service request, and also notifies a multi-connection management module in the operating system 2.

After receiving the multimedia messaging service request, the multi-connection management module in the operating system 2 may refresh a usage status of the channel resource in the operating system 2 according to the multimedia messaging service request. Further, the multi-connection management module in the operating system 2 may mark a status (i.e. the usage status) of the channel resource as a status of multimedia messaging service request connection.

The upper-layer logic processing module in the operating system 2 may further send the multimedia messaging service request to an upper-layer logic processing module in the other operating system. The other operating system may include an operating system running in background and another operating system running in foreground in the mobile terminal. Certainly, in specific application, the mobile terminal may have only one operating system running in foreground.

Step B3: After receiving a message about the data service request of the operating system 2, an upper-layer logic processing module in the other operating system instructs a UI processing module in the other operating system to perform corresponding processing, and also notifies a multi-connection management module in the other operating system.

Further, the upper-layer logic processing module in the other operating system may instruct the UI processing module in the other operating system to refresh display of a usage status of the channel resource, and instruct the multi-connection management module in the other operating system to update a record about the usage status of the channel resource.

It is assumed that both the operating system 1 and the operating system N are operating systems running in background. The operating system 1 and the operating system N may display, in a UI processing module in each of the operating system 1 and the operating system N according to the multimedia messaging service request, the status of multimedia messaging service request connection, and the like. In addition, the multi-connection management module in the other operating system may also refresh, according to the multimedia messaging service request of the operating system 2, the usage status that is of the channel resource and that is recorded in the other operating system.

Step B4: The multi-connection management module in each operating system sends, to the logic control module for sharing and accessing an underlying protocol resource, a message for deleting a current data connection.

Because there is only one channel resource, each operating system may send, to the logic control module for sharing and accessing an underlying protocol resource using the multi-connection management module, the message for deleting the current data connection such that the logic control module for sharing and accessing an underlying protocol resource releases the channel resource to provide a data connection for the multimedia messaging service.

Step B5: After completing processing data service messages of all the operating systems, the logic control module for sharing and accessing an underlying protocol resource instructs the RIL module to delete the current data connection.

Further, the logic control module for sharing and accessing an underlying protocol resource may record current information of the data service in each operating system for subsequent data service restoration.

After recording the current information, the logic control module for sharing and accessing an underlying protocol resource instructs the RIL module to delete the current data connection.

Step B6: The RIL module commands the modem to delete the current data connection.

Step B7: After deleting the current data connection, the modem notifies the RIL module.

Step B8: The RIL module returns a message to the logic control module for sharing and accessing an underlying protocol resource.

Further, the RIL module returns a feedback result of data connection deletion to the logic control module for sharing and accessing an underlying protocol resource.

Step B9: After performing logical processing, the logic control module for sharing and accessing an underlying protocol resource notifies the multi-connection management module in each operating system.

For example, the logic control module for sharing and accessing an underlying protocol resource may mark a data connection state in each operating system as a non-data connection state or a data connection pause state, and notify the multi-connection management module in each operating system of the state information.

The multi-connection management module in each operating system refreshes, according to the feedback result of the data connection deletion, the usage status that is of the channel resource and is recorded in each operating system.

Step B10: The multi-connection management module in each operating system returns a result to the upper-layer logic processing module in each operating system.

Step B11: The upper-layer logic processing module instructs a UI processing module in each operating system to refresh a result.

Further, the UI processing module in each operating system may remove display of the current data connection, display a pause of the current data connection, or the like.

Step B12: The multi-connection management module in the operating system 2 sends, to the logic control module for sharing and accessing an underlying protocol resource, a message for establishing a new data connection.

Further, the multi-connection management module in the operating system 2 may send, to the logic control module for sharing and accessing an underlying protocol resource, the message for establishing a new data connection. Certainly, the other operating system such as the operating system 1 or the operating system N may also send the message to the logic control module for sharing and accessing an underlying protocol resource using the multi-connection management module in the other operating system.

Step B13: After completing processing the data service messages of all the operating systems, the logic control module for sharing and accessing an underlying protocol resource instructs the RIL module to establish a new data connection.

Step B14: The RIL module commands the modem to establish a new data connection.

Step B15: The modem establishes a new data connection for transmission, deletes the data connection after the transmission is completed, and notifies the RIL module.

After establishing the data connection, the modem may feedback a message that the data connection is established to the upper-layer logic processing module in the operating system 2 using the RIL module, the logic control module for sharing and accessing an underlying protocol resource, the multi-connection management module in the operating system 2, and the like. In this way, the upper-layer logic processing module in the operating system 2 may perform multimedia messaging service transmission on the newly-established data connection. After the multimedia messaging service transmission is completed, the modem may delete the data connection established for the multimedia messaging service, and notify the RIL module after deleting the data connection.

Step B16: The RIL module returns a message to the logic control module for sharing and accessing an underlying protocol resource.

Step B17: After performing logical processing, the logic control module for sharing and accessing an underlying protocol resource notifies the multi-connection management module in each operating system.

For example, the logic control module for sharing and accessing an underlying protocol resource may set the status of the channel resource as an idle state, and the multi-connection management module in each operating system updates, to an idle state according to a message of the logic control module for sharing and accessing an underlying protocol resource, the usage status that is of the channel resource and is recorded in each operating system.

Step B18: The multi-connection management module in each operating system returns a result to the upper-layer logic processing module in each operating system.

Step B19: The upper-layer logic processing module instructs the UI processing module in each operating system to refresh a result.

Further, the UI processing module in each operating system may display completion of multimedia messaging service transmission, no longer display a multimedia messaging service connection, or the like.

Step B20: The multi-connection management module in each operating system sends, to the logic control module for sharing and accessing an underlying protocol resource, a message for re-establishing the previous data connection.

Step B21: After completing processing the data service messages of all the operating systems, the logic control module for sharing and accessing an underlying protocol resource instructs the RIL module to re-establish the previous data connection.

The logic control module for sharing and accessing an underlying protocol resource may restore the data connection according to the previously-recorded data connection information after completing processing the data service messages of all the operating systems.

Step B22: The RIL module commands the modem to re-establish the previous data connection.

Step B23: After successfully establishing the previous data connection, the modem notifies the RIL module.

Step B24: The RIL module returns a message to the logic control module for sharing and accessing an underlying protocol resource.

Step B25: After performing logical processing, the logic control module for sharing and accessing an underlying protocol resource notifies the multi-connection management module in each operating system.

The logic control module for sharing and accessing an underlying protocol resource performs, according to the message fed back by the RIL module, coordinated management on channel resource occupation performed by data connections of all the operating systems, and feeds back a channel resource occupation result to the multi-connection management module in each operating system. The multi-connection management module in each operating system refreshes, according to a feedback result of data connection re-establishment, the usage status that is of the channel resource and is recorded in each operating system.

Step B26: The multi-connection management module in each operating system returns a result to the upper-layer logic processing module in each operating system.

Step B27: The upper-layer logic processing module instructs the UI processing module in each operating system to refresh a result.

The upper-layer logic processing module in each operating subsystem sends the feedback result of the data connection re-establishment to the UI processing module in each operating system such that the UI processing module in each operating system refreshes the usage status of the channel resource in each operating system.

In this embodiment of the present disclosure, in addition to multiple operating systems, a virtual resource sharing control system is set in a mobile terminal in order to perform coordinated management on a channel resource in a modem for all the operating systems, notify another operating system when an operating system running in foreground requests a channel resource, and after an operation (including channel resource allocation and channel resource release) is completed, notify all the operating systems using the virtual resource sharing control system. In this way, each operating system of the mobile terminal monitors and manages a usage status of the channel resource of the mobile terminal in a real time manner, consistency is ensured in the usage statuses of the channel resource in the mobile terminal, and the mobile terminal implements coordinated management of the channel resource in the multiple operating systems.

In addition, it should be understood that the method in this embodiment of the present disclosure may further be expanded to a scenario in which the modem has a multi-channel resource, but does not have an idle resource. In this case, before a new data connection is established, a currently-used channel resource needs to be selected, a data connection in the channel resource is released to establish a new data connection, the new data connection is released after service data transmission is completed, and the original data connection of the channel resource is restored.

Figure 8:
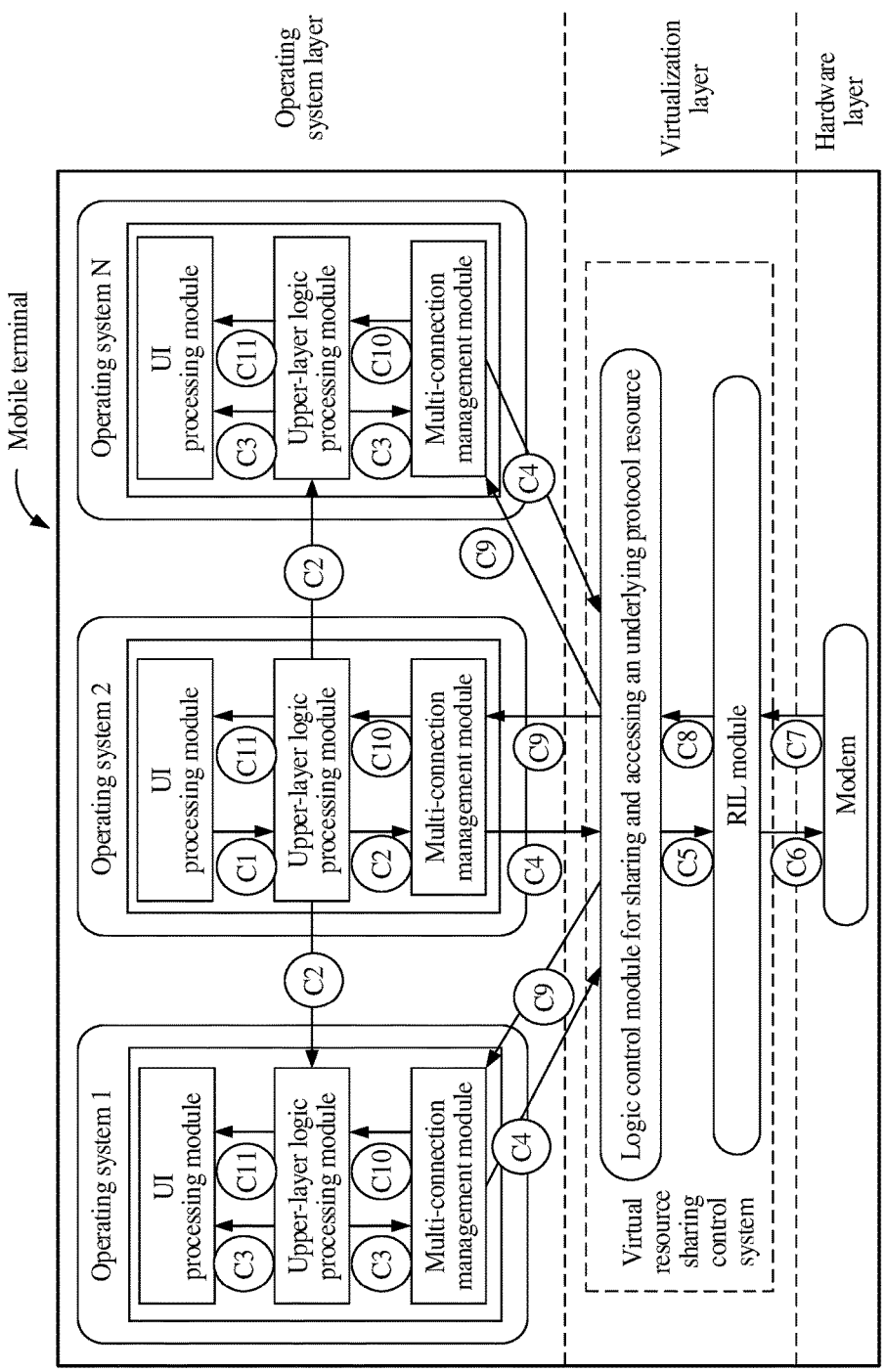
FIG. 8 is another schematic flowchart of concurrent management of multiple data services in a mobile terminal according to an embodiment of the present disclosure.

FIG. 8 is a schematic flowchart of concurrent management of multiple data services in a mobile terminal according to an embodiment of the present disclosure. In FIG. 8, the mobile terminal may include three layers, that is, multiple operating systems, such as an operating system 1, an operating system 2, . . . , and an operating system N, at an operating system layer, a virtual resource sharing control system at a virtualization layer, a modem and the like at a hardware layer. The operating system 1, the operating system 2, . . . , and the operating system N are equivalent to the operating systems 310 in the embodiments shown in FIG. 3 to FIG. 5, the virtual resource sharing control system is equivalent to the virtual resource sharing control system 320 in the embodiments shown in FIG. 3 to FIG. 5, and the modem is equivalent to the modem 330 in the embodiments shown in FIG. 3 to FIG. 5. The modem may be configured to provide a data connection resource for the mobile terminal. In this embodiment of the present disclosure, a channel resource that can be provided by the modem is a multi-channel resource.

In addition, each operating system may include a UI processing module, an upper-layer logic processing module, and a multi-connection management module. A UI processing module may be configured to display a current usage status of a channel resource of the mobile terminal to a user, and send a data service request of the user to an upper-layer logic processing module in a current operating system in which the UI processing module is located. The upper-layer logic processing module may be configured to forward a message from a UI display interface module in the current operating system to the upper-layer logic processing module in the current operating system and a multi-connection management module in another operating system, or forward a message from a multi-connection management module in the current operating system to the UI processing module in the current operating system, or forward a message from an upper-layer logic processing module in another operating system to a UI display interface module in the current operating system and a multi-connection management module in the current operating system. The multi-connection management module may record a current usage status of a channel resource in the current operating system, and further configured to refresh the current usage status of the channel resource in the current operating system according to a message of the current operating system, or refresh the current usage status of the channel resource in the current operating system according to a channel resource usage result fed back by the virtualization layer.

It should be understood that a usage status of a channel resource may include a channel resource that is being used by the current operating system, whether a data connection is already established, or the like. Certainly, the usage status of the channel resource may further include other information related to channel resource usage, which is not described in this embodiment of the present disclosure.

In addition, the virtualization layer may further include a logic control module for sharing and accessing an underlying protocol resource and a RIL module. The logic control module for sharing and accessing an underlying protocol resource is configured to provide a unified interface for sharing and accessing an underlying protocol resource for all the operating systems, and a RIL is configured to implement an access interface with an entity device the modem. Further, the logic control module for sharing and accessing an underlying protocol resource may determine channel resource allocation according to data service requests of all the operating systems and with reference to the current usage status of the channel resource, and allocate the channel resource in the modem using the RIL. In addition, the logic control module for sharing and accessing an underlying protocol resource may further forward, to each operating system, a result fed back by the modem using the RIL. Further, in this embodiment of the present disclosure, the channel resource allocation may include data connection establishment and data connection release in the channel resource.

Certainly, it should be understood that, in practical application, an operating system or a virtualization layer may have different functions, but the operating system can implement functions in the embodiments shown in FIG. 3 to FIG. 5.

In addition, in FIG. 8, circle symbols are configured to indicate step numbers of arrows on the right of the circles or arrows in which the circles are located. A multimedia messaging service is used as an example in this embodiment of the present disclosure for description, and a specific procedure for implementing the concurrent management of the multiple data services by the mobile terminal is as follows.

Step C1: A user performs an interface operation to generate a service operation for establishing a new data connection.

In this embodiment of the present disclosure, the operating system 2 is an operating system that is currently used by the mobile terminal, and the multi-channel resource in the modem is already used, but there is at least one idle channel resource. In addition, it is assumed that the service operation for establishing a new data connection is a multimedia messaging service (an operation for sending multimedia message service message).

Step C2: After receiving a message for establishing a new data connection, an upper-layer logic processing module in the operating system 2 notifies another operating system of the message, and also notifies a multi-connection management module in the operating system 2.

After receiving the multimedia messaging service request, the multi-connection management module in the operating system 2 may refresh a usage status of the channel resource in the operating system 2 according to the multimedia messaging service request. Further, the multi-connection management module in the operating system 2 may mark a status of the channel resource as a status of multimedia messaging service request connection.

The upper-layer logic processing module in the operating system 2 may further send the multimedia messaging service request to an upper-layer logic processing module in the other operating system. The other operating system may include an operating system running in background and another operating system running in foreground in the mobile terminal. Certainly, in specific application, the mobile terminal may have only one operating system running in foreground.

Step C3: After receiving a message about a data service request of the operating system 2, an upper-layer logic processing module in the other operating system instructs a UI processing module in the other operating system to perform corresponding processing, and also notifies a multi-connection management module in the other operating system.

Further, the upper-layer logic processing module in the other operating system may instruct the UI processing module in the other operating system to refresh display of a usage status of the channel resource, and instruct the multi-connection management module in the other operating system to update a record about the usage status of the channel resource.

For example, the operating system 1 and the operating system N may display, in a UI processing module in each of the operating system 1 and the operating system N according to the multimedia messaging service request, the status of multimedia messaging service request connection, and the like. In addition, the multi-connection management module in the other operating system may also refresh, according to the multimedia messaging service request of the operating system 2, the usage status that is of the channel resource and that is recorded in the other operating system.

Step C4: The multi-connection management module in each operating system sends a message to the logic control module for sharing and accessing an underlying protocol resource.

Each operating system may send usage information of a current data connection to the logic control module for sharing and accessing an underlying protocol resource using the multi-connection management modules such that the logic control module for sharing and accessing an underlying protocol resource selects an idle channel resource to provide a data connection for the multimedia messaging service.

Step C5: After completing processing the data service messages of all the operating systems, the logic control module for sharing and accessing an underlying protocol resource instructs the RIL module to establish a new data connection.

The logic control module for sharing and accessing an underlying protocol resource selects the idle channel resource according to the data service messages of all the operating systems, and instructs the RIL module to establish a new data connection on the idle channel resource.

Step C6: The RIL module commands the modem to establish a new data connection.

The RIL module instructs the modem to establish a new data connection on the idle channel resource.

Step C7: After successfully establishing a data connection, the modem notifies the RIL module.

The modem establishes the data connection according to an instruction of the RIL module, and feeds back a result of data connection establishment to the RIL module.

Step C8: The RIL module returns a message to the logic control module for sharing and accessing an underlying protocol resource.

The RIL module returns, to the logic control module for sharing and accessing an underlying protocol resource, the message fed back by the modem such that the logic control module for sharing and accessing an underlying protocol resource performs corresponding logical processing.

Step C9: After performing logical processing, the logic control module for sharing and accessing an underlying protocol resource notifies each operating system.

The logic control module for sharing and accessing an underlying protocol resource refreshes the usage status of the channel resource in the modem according to the feedback result and a current usage status that is of the channel resource in the modem and that is recorded in the logic control module for sharing and accessing an underlying protocol resource, and notifies the multi-connection management module in each operating system of the feedback result.

Step C10: The multi-connection management module in each operating system returns a result to the upper-layer logic processing module in each operating system.

The multi-connection management module in each operating system returns the feedback result to the upper-layer logic processing module in each operating system such that the upper-layer logic processing module in each operating system refreshes the usage status of the channel resource using the UI processing module in each operating system.

Step C11: The upper-layer logic processing module instructs a UI processing module in each operating system to refresh a result.

The upper-layer logic processing module in each operating system instructs the UI processing module in each operating system to refresh the usage status of the channel resource.

In this embodiment of the present disclosure, in addition to multiple operating systems, a virtual resource sharing control system is set in a mobile terminal in order to perform coordinated management on a channel resource in a modem for all the operating systems, notify another operating system when an operating system running in foreground requests a channel resource, and after an operation (including channel resource allocation and channel resource release) is completed, notify all the operating systems using the virtual resource sharing control system. In this way, each operating system of the mobile terminal monitors and manages a usage status of the channel resource of the mobile terminal in a real time manner, consistency is ensured in the usage statuses of the channel resource in the mobile terminal, and the mobile terminal implements coordinated management of the channel resource in the multiple operating systems.

Figure 9:
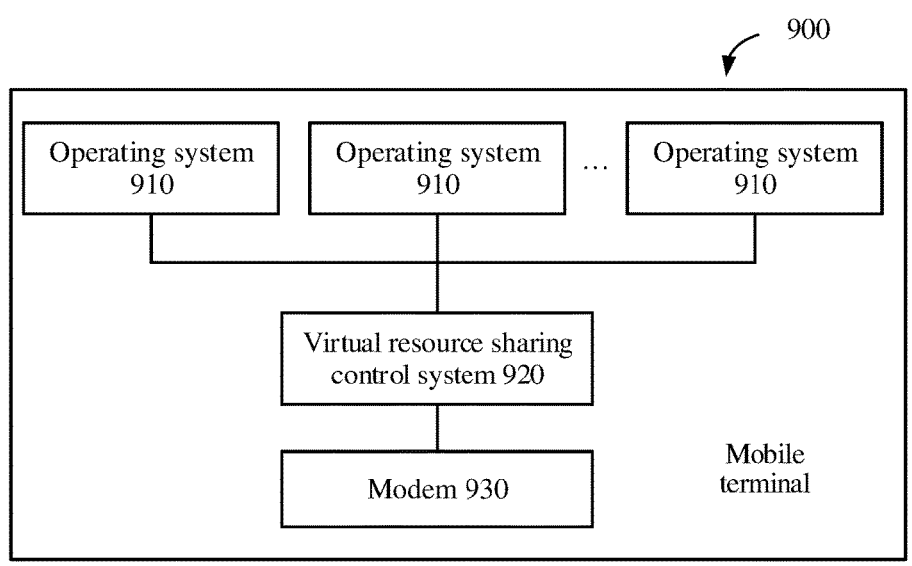
FIG. 9 is a schematic structural diagram of a mobile terminal according to an embodiment of the present disclosure.

FIG. 9 is a schematic structural diagram of a mobile terminal 900 according to an embodiment of the present disclosure. According to the mobile terminal 900 in this embodiment of the present disclosure, a problem of uncoordinated management of a channel resource during concurrence of multiple connections can be resolved to some extent. As shown in FIG. 9, the mobile terminal 900 may include multiple operating systems 910, a virtual resource sharing control system 920, and a modem 930.

The modem 930 is configured to provide a channel resource for a data connection of the mobile terminal 900.

A first operating system in the multiple operating systems 910 is configured to receive a data service request of a user of the mobile terminal 900, and notify a second operating system and the virtual resource sharing control system 920 of the data service request, where a new data connection needs to be established for the data service request, the first operating system is an operating system that is in the multiple operating systems 910 and that runs in foreground, and the second operating system is one or more operating systems, except the first operating system, in the multiple operating systems 910, or the second operating system is all other operating systems, except the first operating system, in the multiple operating systems 910.

The virtual resource sharing control system 920 is configured to perform coordinated management on usage of the channel resource for the multiple operating systems 910, and further configured to establish a data connection for the data service request according to the data service request and a current usage status of the channel resource in the modem 930, and send a feedback result of data connection establishment to the first operating system and the second operating system.

The first operating system is further configured to manage and monitor a usage status of the channel resource in the first operating system according to the feedback result. The second operating system is further configured to manage and monitor a usage status of the channel resource in the second operating system according to the data service request or the feedback result.

In this embodiment of the present disclosure, in addition to multiple operating systems 910, a virtual resource sharing control system 920 is set in a mobile terminal 900 in order to perform coordinated management on a channel resource in a modem 930 for the multiple operating systems 910, notify another operating system when an operating system running in foreground requests a channel resource, and after an operation (including channel resource allocation and channel resource release) is completed, notify the multiple operating systems 910 using the virtual resource sharing control system 920. In this way, each operating system of the mobile terminal 900 monitors and manages a usage status of the channel resource of the mobile terminal 900 in a real time manner, consistency is ensured in the usage statuses of the channel resource in the mobile terminal 900, and the mobile terminal 900 implements coordinated management of the channel resource in the multiple operating systems 910.

Figure 10:
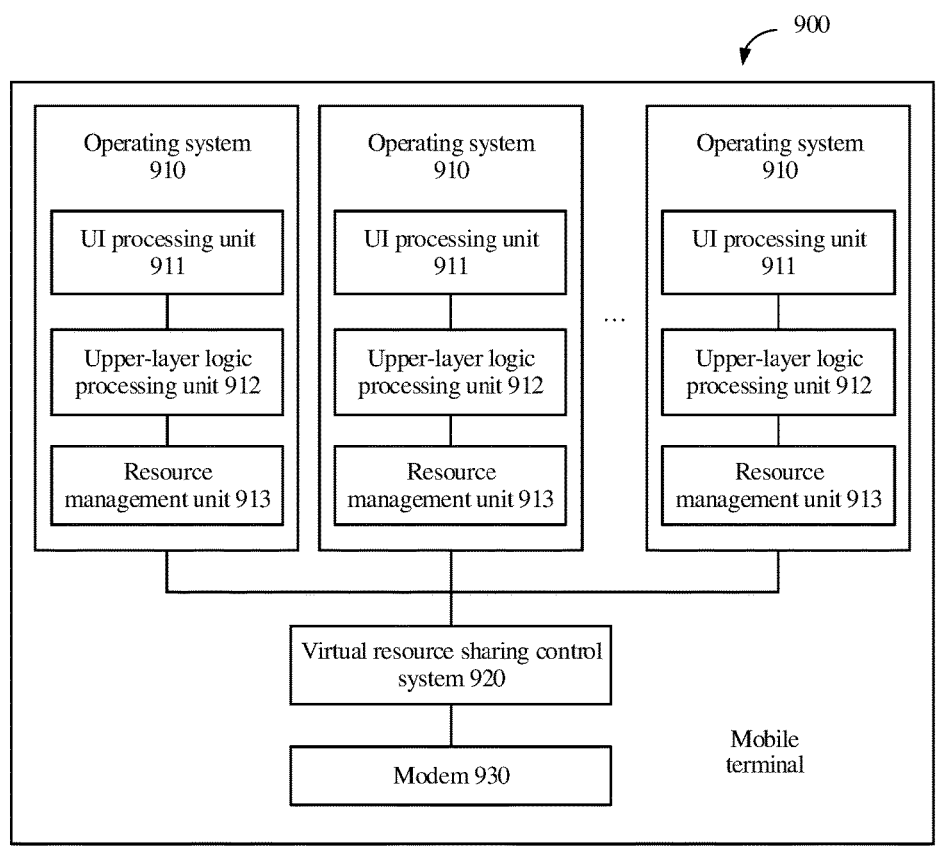
FIG. 10 is another schematic structural diagram of a mobile terminal according to an embodiment of the present disclosure.

FIG. 10 is another schematic structural diagram of a mobile terminal 900 according to an embodiment of the present disclosure. Optionally, as shown in FIG. 10, with reference to the FIG. 9, each one of the multiple operating systems 910 may further include a UI processing unit 911, an upper-layer logic processing unit 912, and a resource management unit 913. During management of concurrent connections of multiple services, UI, UI processing units 911, upper-layer logic processing units 912, and resource management units 913 may be further configured to implement the following functions.

A UI processing unit 911 in the first operating system is configured to receive the data service request, and notify an upper-layer logic processing unit 912 in the current operating system of the data service request. The upper-layer logic processing unit 912 in the first operating system is configured to notify a resource management unit 913 in the first operating system of the data service request. The resource management unit 913 in the first operating system is configured to manage and monitor the usage status of the channel resource in the first operating system according to the data service request, and notify the virtual resource sharing control system 920 such that the virtual resource sharing control system 920 allocates a corresponding channel resource to the data service request to establish the data connection. The upper-layer logic processing unit 912 in the first operating system is further configured to notify an upper-layer logic processing unit 912 in the second operating system of the data service request. The upper-layer logic processing unit 912 in the second operating system is configured to notify a resource management unit 913 in the second operating system of the data service request. The resource management unit 913 in the second operating system is configured to manage and monitor the usage status of the channel resource in the second operating system according to the data service request. The resource management unit 913 in the first operating system is further configured to receive the second feedback result, and manage and monitor the usage status of the channel resource in the first operating system according to the second feedback result, and the resource management unit 913 in the second operating system is further configured to receive the second feedback result, and manage and monitor the usage status of the channel resource in the second operating system according to the second feedback result.

Optionally, in an embodiment, in a process of establishing the data connection for the data service request according to the data service request and the current usage status of the channel resource in the modem 930, the virtual resource sharing control system 920 is further configured to select a currently-used channel resource in the modem 930, disable a first data connection of the currently-used channel resource, and establish a second data connection for the data service request when no idle channel resource is in the modem 930. In addition, the virtual resource sharing control system 920 is further configured to release the second data connection, and restore the first data connection after a data service corresponding to the data service request is completed.

Optionally, in another embodiment, in a process of establishing the data connection for the data service request according to the data service request and the current usage status of the channel resource in the modem 930, the virtual resource sharing control system 920 is further configured to select the idle channel resource to establish a second data connection for the data service request when an idle channel resource is in the modem 930. In addition, the virtual resource sharing control system 920 is further configured to release the second data connection after a service corresponding to the data service request is completed.

It should be understood that, when the channel resource in the modem 930 is a single-channel resource, and the single-channel resource is not used, the virtual resource sharing control system 920 may directly establish, on the single-channel resource, the second data connection corresponding to the service request. Alternatively, when the channel resource in the modem 930 is a multi-channel resource, and a current channel resource of the current operating system can meet the service request, the virtual resource sharing control system 920 may establish, on the current channel resource of the current operating system, the second data connection corresponding to the service request. For specific implementation, reference may be made to the other approaches. The details are not described in this embodiment of the present disclosure.

Figure 11:
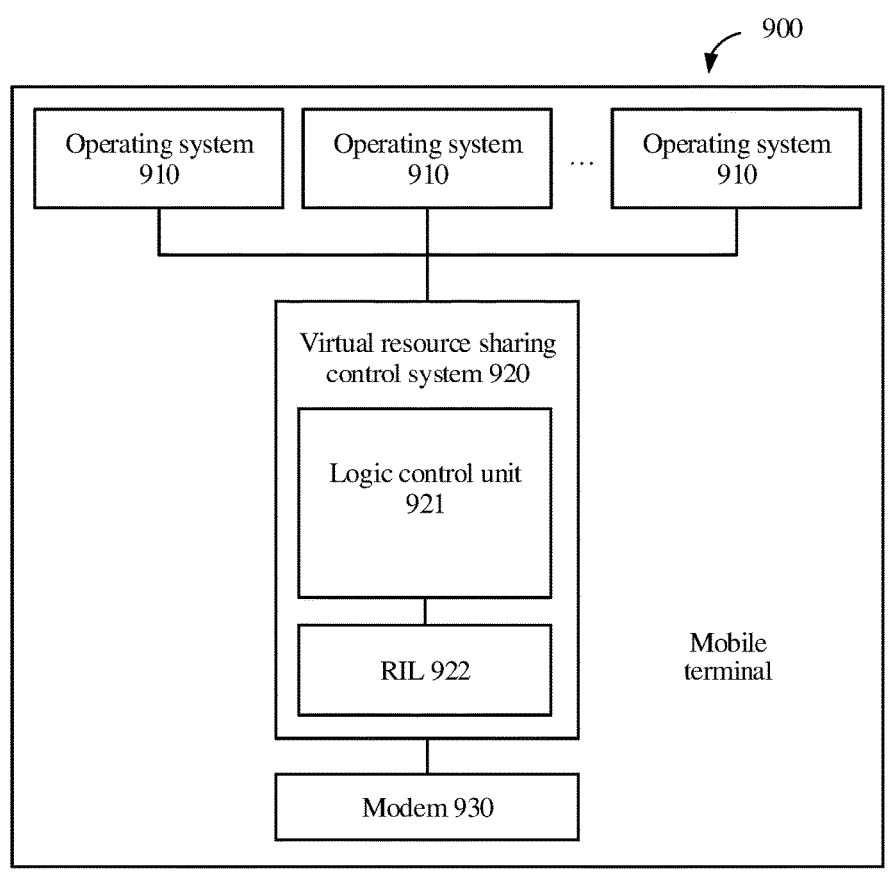
FIG. 11 is another schematic structural diagram of a mobile terminal according to an embodiment of the present disclosure.

FIG. 11 is another schematic structural diagram of a mobile terminal 900 according to an embodiment of the present disclosure. Optionally, as shown in FIG. 11, with reference to the FIG. 9, a virtual resource sharing control system 920 may further include a logic control module 921 for sharing and accessing an underlying protocol resource and a RIL 922.

The logic control module 921 for sharing and accessing an underlying protocol resource is configured to provide a unified underlying protocol resource sharing access interface for the multiple operating systems 910, and the RIL 922 is configured to implement an access interface with an entity device, the modem 930.

In addition, the mobile terminal 900 may further implement functions of the embodiments shown in FIG. 7 and FIG. 8 and expanded embodiments thereof. In this case, in FIG. 7 and FIG. 8, the operating system 1, the operating system 2, . . . , and the operating system N are equivalent to the multiple operating systems 910 in the embodiments shown in FIG. 9 to FIG. 11, the virtual resource sharing control system is equivalent to the virtual resource sharing control system 920 in the embodiments shown in FIG. 9 to FIG. 11, and the modem is equivalent to the modem 930 in the embodiments shown in FIG. 9 to FIG. 11. Details are not described in this embodiment of the present disclosure.

Certainly, it should be understood that, in specific implementation, a logical unit in the embodiments shown in the foregoing FIG. 9 to FIG. 11 may be a functional module. For example, a UI processing module may implement a logical function of a UI processing unit 911, an upper-layer logic processing module may implement a logical function of an upper-layer logic processing unit 912, a resource management module may implement a logical function of a resource management unit 913, a logic control module for sharing and accessing an underlying protocol resource may implement a logical function of a logic control unit 921 for sharing and accessing an underlying protocol resource, and so on. Details are not described in this embodiment of the present disclosure.

Figure 12:
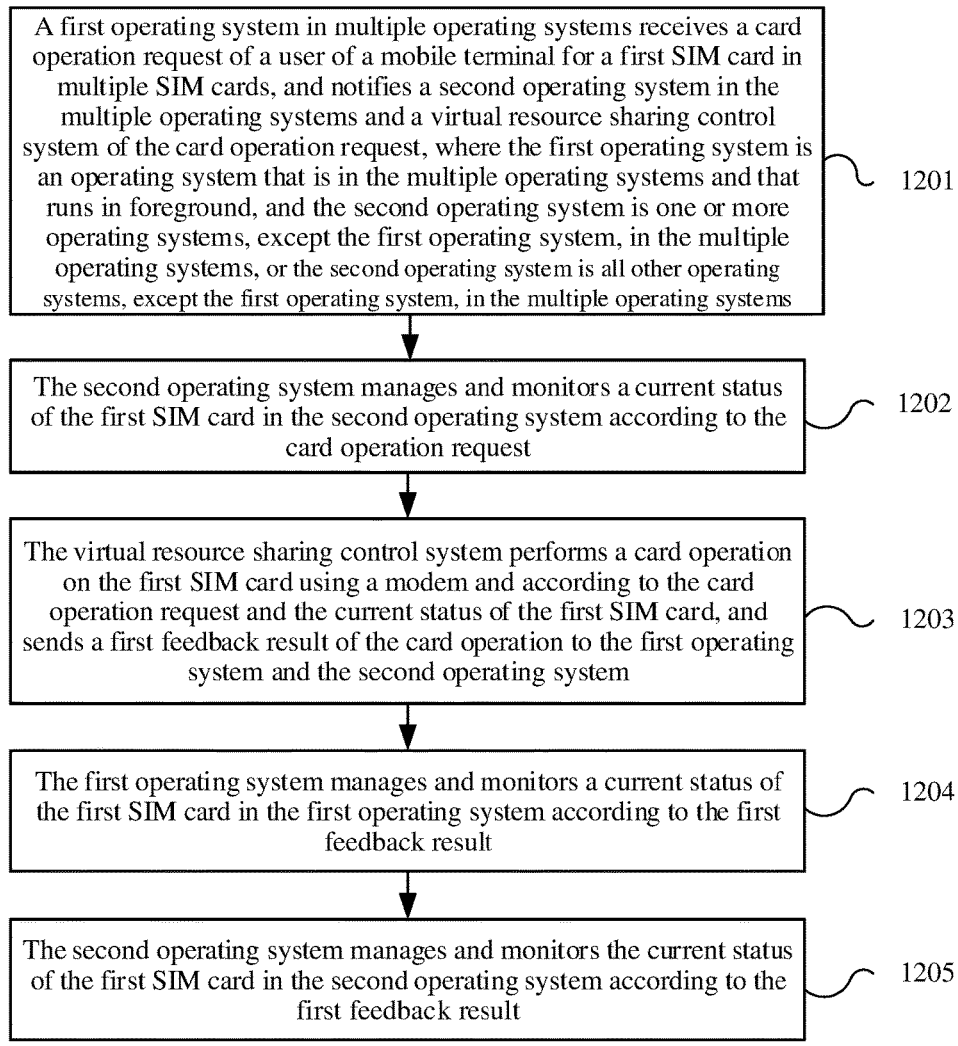
FIG. 12 is a flowchart of a resource management method of a mobile terminal according to an embodiment of the present disclosure.

FIG. 12 is a flowchart of a resource management method of a mobile terminal according to an embodiment of the present disclosure. The mobile terminal with multiple systems in this embodiment of the present disclosure includes multiple operating systems, a virtual resource sharing control system, and a modem. Multiple SIM cards are deployed in the modem. The method includes the following steps.

Step 1201: A first operating system in the multiple operating systems receives a card operation request of a user of the mobile terminal for a first SIM card in the multiple SIM cards, and notifies a second operating system in the multiple operating systems and the virtual resource sharing control system of the card operation request, where the first operating system is an operating system that is in the multiple operating systems and that runs in foreground, and the second operating system is one or more operating systems, except the first operating system, in the multiple operating systems, or the second operating system is all other operating systems, except the first operating system, in the multiple operating systems.

Step 1202: The second operating system manages and monitors a current status of the first SIM card in the second operating system according to the card operation request.

Step 1203: The virtual resource sharing control system performs a card operation on the first SIM card using the modem and according to the card operation request and the current status of the first SIM card, and sends a first feedback result of the card operation to the first operating system and the second operating system.

Step 1204: The first operating system manages and monitors a current status of the first SIM card in the first operating system according to the first feedback result.

Step 1205: The second operating system manages and monitors the current status of the first SIM card in the second operating system according to the first feedback result.

In this embodiment of the present disclosure, in addition to multiple operating systems, a virtual resource sharing control system is set in a mobile terminal in order to perform coordinated management on multiple SIM card resources in a modem for all the operating systems, notify another operating system when an operating system running in foreground performs an operation on the SIM card resources, and after the operation is completed, notify all the operating systems using the virtual resource sharing control system. In this way, each operating system of the mobile terminal monitors and manages usage statuses of the multiple SIM card resources of the mobile terminal in a real time manner, consistency is ensured in the usage statuses of the multiple SIM card resources in the mobile terminal, and the mobile terminal implements coordinated management of the multiple SIM card resources in the multiple operating systems.

Figure 13A:
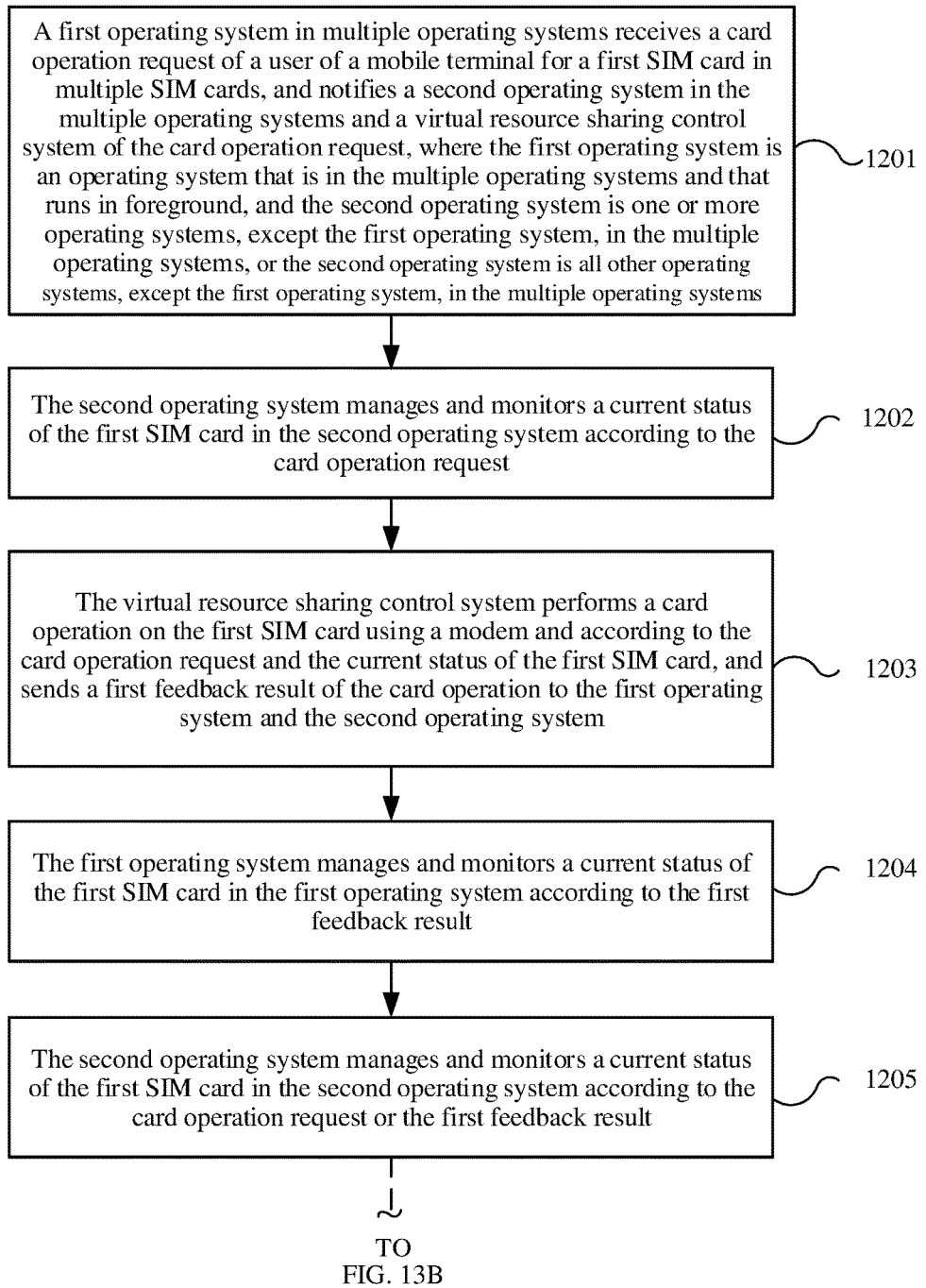
FIG. 13A and FIG. 13B are a flowchart of another resource management method of a mobile terminal according to an embodiment of the present disclosure.
Figure 13B:
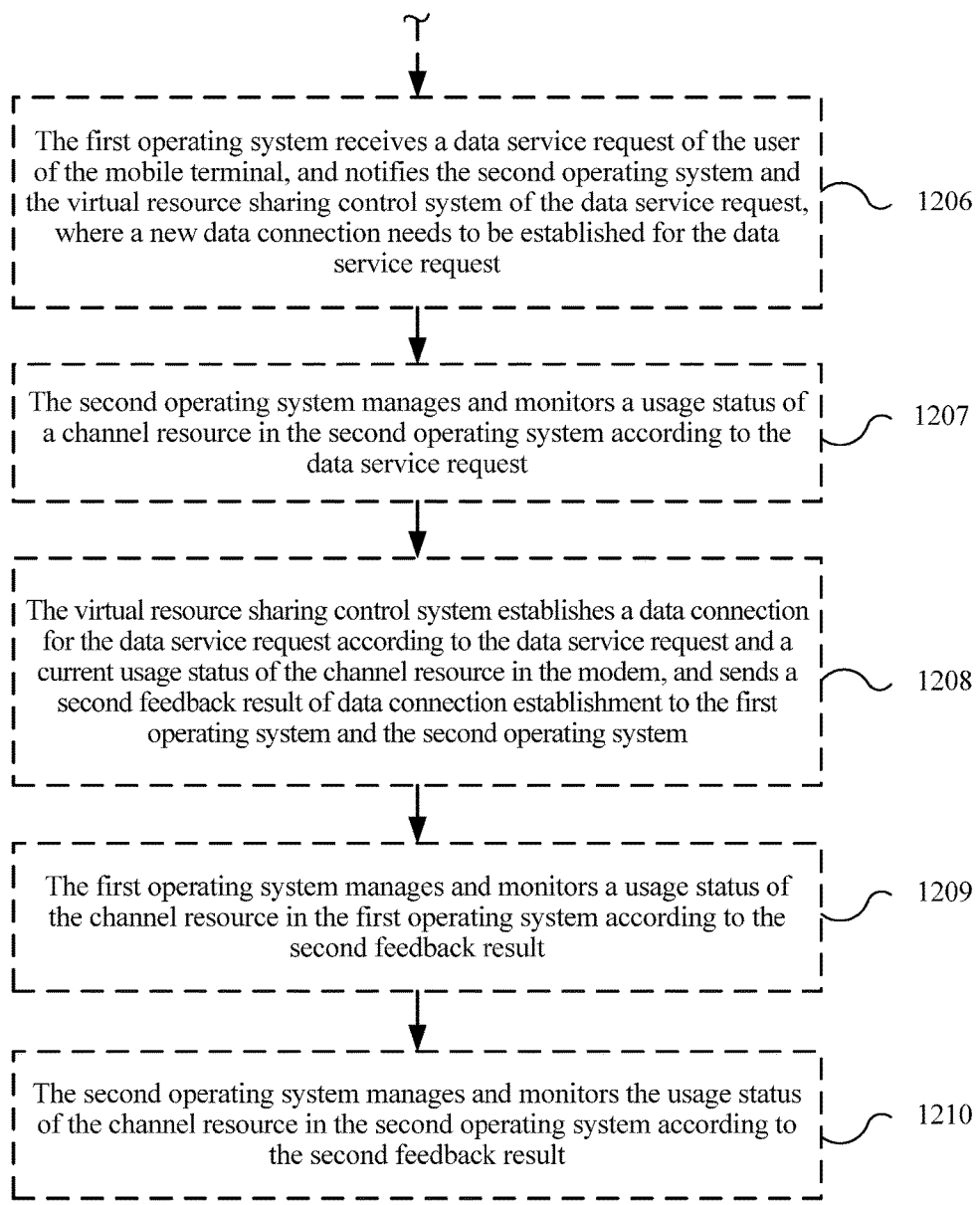

Further, the modem is further configured to provide a channel resource for a data connection of the mobile terminal. As shown in FIG. 13A and FIG. 13B, the method may further include the following steps.

Step 1206: The first operating system receives a data service request of the user of the mobile terminal, and notifies the second operating system and the virtual resource sharing control system of the data service request, where a new data connection needs to be established for the data service request.

Step 1207: The second operating system manages and monitors a usage status of the channel resource in the second operating system according to the data service request.

Step 1208: The virtual resource sharing control system establishes a data connection for the data service request according to the data service request and a current usage status of the channel resource in the modem, and sends a second feedback result of data connection establishment to the first operating system and the second operating system.

Step 1209: The first operating system manages and monitors a usage status of the channel resource in the first operating system according to the second feedback result.

Step 1210: The second operating system manages and monitors the usage status of the channel resource in the second operating system according to the second feedback result.

In this embodiment of the present disclosure, another operating system is notified when an operating system running in foreground requests a channel resource, and all the operating systems are notified using a virtual resource sharing control system after an operation (including channel resource allocation and channel resource release) is completed. In this way, each operating system of a mobile terminal can further monitor and manage a usage status of the channel resource of the mobile terminal in a real time manner, consistency is ensured in the usage statuses of the channel resource in the mobile terminal, and the mobile terminal can further implement coordinated management of the channel resource in the multiple operating systems.

For specific implementation of this embodiment of the present disclosure, reference may be made to the methods in the specific embodiments in FIG. 6 to FIG. 8. Details are not described in this embodiment of the present disclosure.

Figure 14:
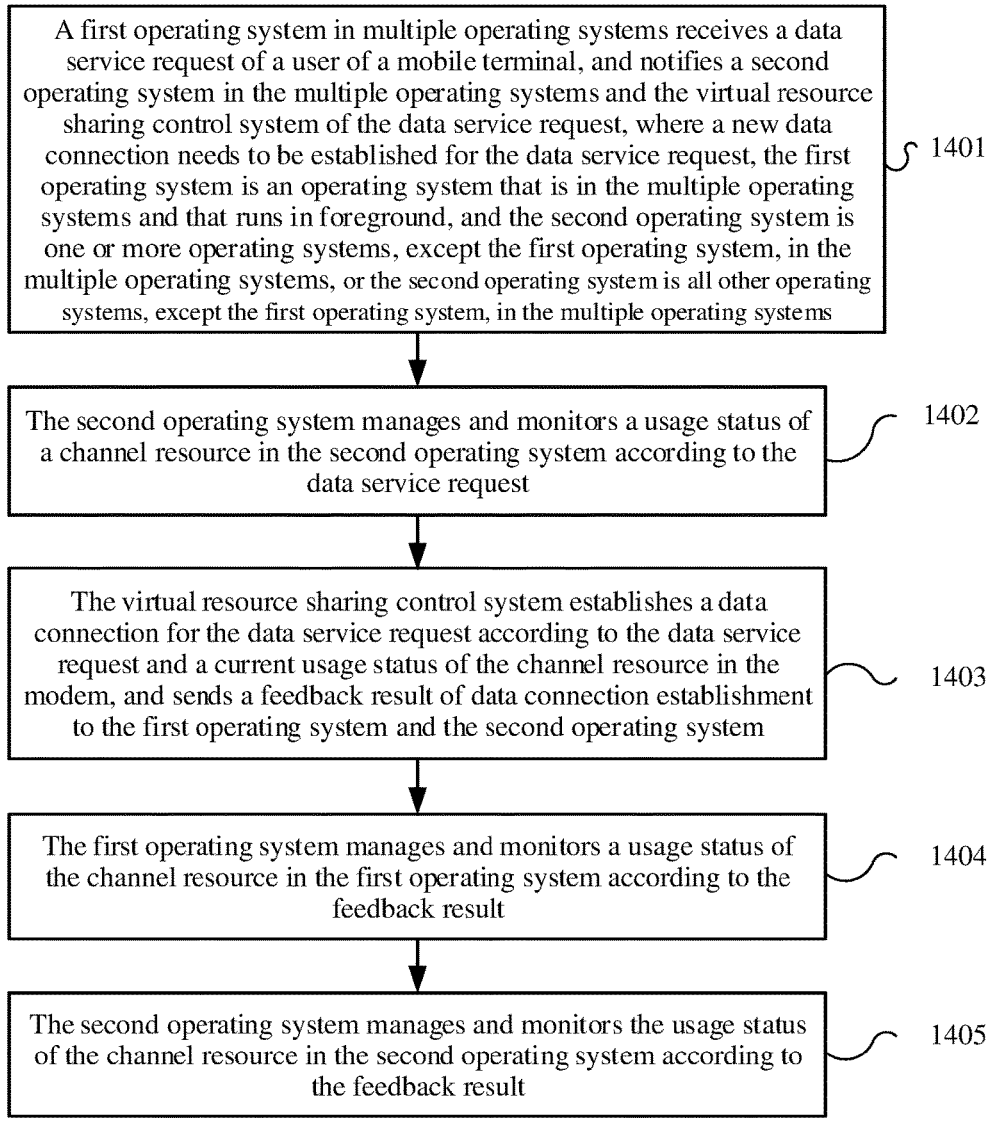
FIG. 14 is a flowchart of still another resource management method of a mobile terminal according to an embodiment of the present disclosure.

FIG. 14 is a flowchart of a resource management method of a mobile terminal according to an embodiment of the present disclosure. The mobile terminal with multiple systems in this embodiment of the present disclosure includes multiple operating systems, a virtual resource sharing control system, and a modem. The modem is configured to provide a channel resource for a data connection of the mobile terminal. The method includes the following steps.

Step 1401: A first operating system in the multiple operating systems receives a data service request of a user of the mobile terminal, and notifies a second operating system in the multiple operating systems and the virtual resource sharing control system of the data service request, where a new data connection needs to be established for the data service request, the first operating system is an operating system that is in the multiple operating systems and that runs in foreground. The second operating system is one or more operating systems, except the first operating system, in the multiple operating systems, or the second operating system is all other operating systems, except the first operating system, in the multiple operating systems.

Step 1402: The second operating system manages and monitors a usage status of the channel resource in the second operating system according to the data service request.

Step 1403: The virtual resource sharing control system establishes a data connection for the data service request according to the data service request and a current usage status of the channel resource in the modem, and sends a feedback result of data connection establishment to the first operating system and the second operating system.

Step 1404: The first operating system manages and monitors a usage status of the channel resource in the first operating system according to the feedback result.

Step 1405: The second operating system manages and monitors the usage status of the channel resource in the second operating system according to the feedback result.

In this embodiment of the present disclosure, another operating system is notified when an operating system running in foreground requests a channel resource, and all the operating systems are notified using a virtual resource sharing control system after an operation (including channel resource allocation and channel resource release) is completed. In this way, each operating system of a mobile terminal can monitor and manage a usage status of the channel resource of the mobile terminal in a real time manner, consistency is ensured in the usage statuses of the channel resource in the mobile terminal, and the mobile terminal implements coordinated management of the channel resource in the multiple operating systems.

For specific implementation of this embodiment of the present disclosure, reference may be made to the methods in the specific embodiments in FIG. 7 and FIG. 8. Details are not described in this embodiment of the present disclosure.

Figure 15:
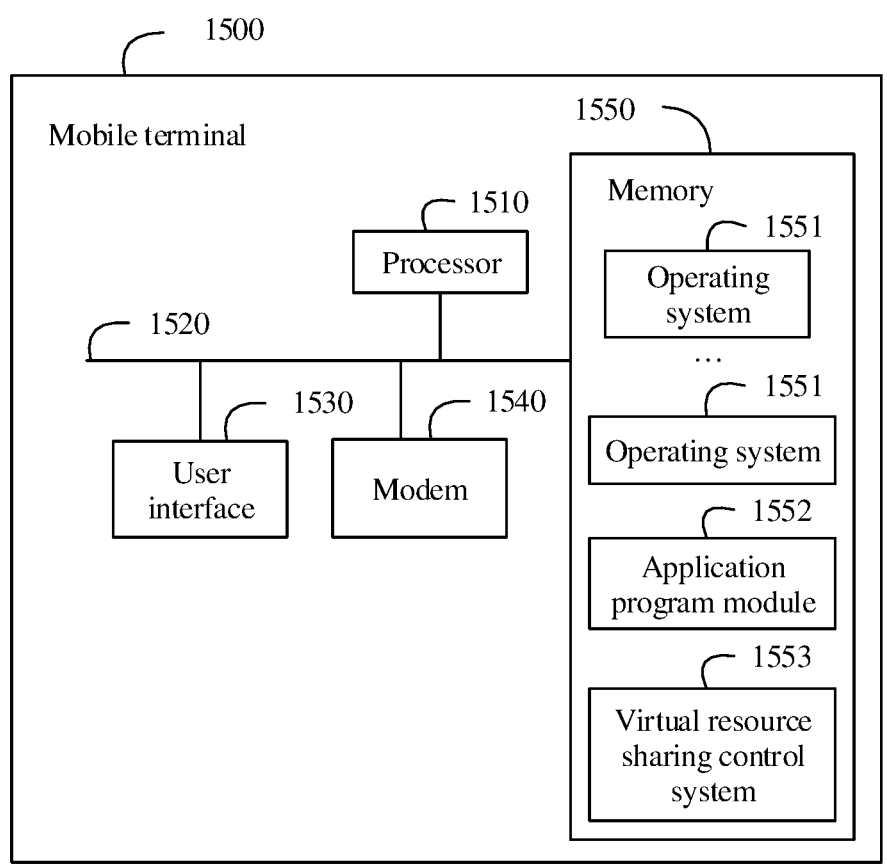
FIG. 15 is still another schematic structural diagram of a mobile terminal according to an embodiment of the present disclosure.

FIG. 15 describes a structure of a mobile terminal 1500 according to an embodiment of the present disclosure. The mobile terminal 1500 includes at least one processor 1510, at least one modem 1540 or a user interface 1530, a memory 1550, and at least one communications bus 1520. The communications bus 1520 is configured to implement connection and communication between these components. Optionally, the mobile terminal 1500 includes the user interface 1530, which includes a display (for example, a touchscreen, a liquid crystal display (LCD), a cathode ray tube (CRT), a holographic imaging device, or a projector), a keyboard, or a click device (for example, a mouse, a trackball, a touchpad, or a touchscreen). In this embodiment of the present disclosure, multiple SIM cards of the mobile terminal 1500 are deployed in the modem 1540.

The memory 1550 may include a read-only memory (ROM) and a random access memory (RAM), and provides an instruction and data for the processor 1510. A part of the memory 1550 may further include a non-volatile RAM (NVRAM).

In some implementation manners, the memory 1550 stores the elements such as an executable module or a data structure, or a subset of the executable module and the data structure, or an extended set of the executable module and the data structure, such as multiple operating systems 1551, including various system programs such as the framework layer, the kernel library layer, and the driver layer shown in FIG. 1, and configured to implement various basic services and process a hardware-based task, an application program module 1552, including various application programs such as the home screen, the media player, and the browser shown in FIG. 1, and configured to implement various application services, and a virtual resource sharing control system 1553, including a virtual resource sharing control interface such as the virtual machine of the kernel library layer shown in FIG. 1, and configured to implement an access control interface between an operating system and a hardware layer.

In this embodiment of the present disclosure, by invoking a program or an instruction stored in the memory 1550, the processor 1510 is configured to in a first operating system in the multiple operating systems 1551, receive a card operation request of a user of the mobile terminal 1500 for a first SIM card in the multiple SIM cards, and notify a second operating system in the multiple operating systems 1551 and the virtual resource sharing control system 1553 of the card operation request, where the first operating system is an operating system that is in the multiple operating systems 1551 and that runs in foreground, and the second operating system is one or more operating systems, except the first operating system, in the multiple operating systems 1551, or the second operating system is all other operating systems, except the first operating system, in the multiple operating systems 1551, in the virtual resource sharing control system 1553, perform a card operation on the first SIM card using the modem 1540 and according to the card operation request and a current status of the first SIM card, and send a first feedback result of the card operation to the first operating system and the second operating system, manage and monitor, in the first operating system, a current status of the first SIM card in the first operating system according to the first feedback result, and manage and monitor, in the second operating system, a current status of the first SIM card in the second operating system according to the card operation request or the first feedback result.

In this embodiment of the present disclosure, in addition to multiple operating systems 1551, a virtual resource sharing control system 1553 is set in a mobile terminal 1500 in order to perform coordinated management on a channel resource in a modem 1540 for the multiple operating systems 1551, notify another operating system when an operating system running in foreground requests a channel resource, and after an operation (including channel resource allocation and channel resource release) is completed, notify the multiple operating systems 1551 using the virtual resource sharing control system 1553. In this way, each operating system of the mobile terminal 1500 monitors and manages a usage status of the channel resource of the mobile terminal 1500 in a real time manner, consistency is ensured in the usage statuses of the channel resource in the mobile terminal 1500, and the mobile terminal 1500 implements coordinated management of the channel resource in the multiple operating systems 1551.

Optionally, the card operation includes a SIM card startup operation, a SIM card activation operation, a SIM card deactivation operation, or a SIM card switching operation.

Optionally, each one of the multiple operating systems 1551 may further include a UI processing unit (not shown), an upper-layer logic processing unit (not shown), and a resource management unit (not shown). In this case, the processor 1510 is further configured to, in a UI processing unit in the first operating system, receive the card operation request, and notify an upper-layer logic processing unit in the current operating system of the card operation request, in the upper-layer logic processing unit in the first operating system, notify a resource management unit in the first operating system of the card operation request, in the resource management unit in the first operating system, manage and monitor the current status of the first SIM card in the first operating system according to the card operation request, and notify the virtual resource sharing control system 1553 such that the virtual resource sharing control system 1553 performs a corresponding card operation according to the card operation request, in the upper-layer logic processing unit in the first operating system, notify an upper-layer logic processing unit in the second operating system of the card operation request, in the upper-layer logic processing unit in the second operating system, notify a resource management unit in the second operating system of the card operation request, in the resource management unit in the second operating system, manage and monitor the current status of the first SIM card in the second operating system according to the card operation request, in the resource management unit in the first operating system, receive the first feedback result, and manage and monitor the current status of the first SIM card in the first operating system according to the first feedback result, and in the resource management unit in the second operating system, receive the feedback information, and manage and monitor the current status of the first SIM card in the second operating system according to the feedback information.

In addition, the modem 1540 is further configured to provide a channel resource for a data connection of the mobile terminal 1500, and the processor 1510 is further configured to in the first operating system, receive a data service request of the user of the mobile terminal 1500, and notify the second operating system and the virtual resource sharing control system 1553 of the data service request, where a new data connection needs to be established for the data service request, in the virtual resource sharing control system 1553, establish a data connection for the data service request according to the data service request and a current usage status of the channel resource in the modem 1540, and send a second feedback result of data connection establishment to the first operating system and the second operating system, in the first operating system, manage and monitor a usage status of the channel resource in the first operating system according to the second feedback result, and in the second operating system, manage and monitor a usage status of the channel resource in the second operating system according to the data service request or the second feedback result.

In this embodiment of the present disclosure, in addition to multiple operating systems 1551, a virtual resource sharing control system 1553 is set in a mobile terminal 1500 in order to perform coordinated management on a channel resource in a modem 1540 for the multiple operating systems 1551, notify another operating system when an operating system running in foreground requests a channel resource, and after an operation (including channel resource allocation and channel resource release) is completed, notify all the operating systems using the virtual resource sharing control system. In this way, each operating system of the mobile terminal 1500 monitors and manages a usage status of the channel resource of the mobile terminal 1500 in a real time manner, consistency is ensured in the usage statuses of the channel resource in the mobile terminal 1500, and the mobile terminal 1500 implements coordinated management of the channel resource in the multiple operating systems 1551.

Further, when an operating system includes the UI processing unit, the upper-layer logic processing unit, and the resource management unit, the processor 1510 is further configured to in a UI processing unit in the first operating system, receive the data service request, and notify an upper-layer logic processing unit in the current operating system of the data service request, in the upper-layer logic processing unit in the first operating system, notify a resource management unit in the first operating system of the data service request, in the resource management unit in the first operating system, manage and monitor the usage status of the channel resource in the first operating system according to the data service request, and notify the virtual resource sharing control system 1553 such that the virtual resource sharing control system 1553 allocates a corresponding channel resource to the data service request to establish the data connection, in the upper-layer logic processing unit in the first operating system, notify an upper-layer logic processing unit in the second operating system of the data service request, in the upper-layer logic processing unit in the second operating system, notify a resource management unit in the second operating system of the data service request, in the resource management unit in the second operating system, manage and monitor the usage status of the channel resource in the second operating system according to the data service request, in the resource management unit in the first operating system, receive the second feedback result, and manage and monitor the usage status of the channel resource in the first operating system according to the second feedback result, and in the resource management unit in the second operating system, receive the second feedback result, and manage and monitor the usage status of the channel resource in the second operating system according to the second feedback result.

Optionally, in an embodiment, in a process of establishing the data connection for the data service request according to the data service request and the current usage status of the channel resource in the modem 1540, the processor 1510 is further configured to in the virtual resource sharing control system 1553, when no idle channel resource is in the modem 1540, select a currently-used channel resource in the modem 1540, disable a first data connection of the currently-used channel resource, and establish a second data connection for the data service request. The processor 1510 is further configured to release the second data connection, and restore the first data connection in the virtual resource sharing control system 1553, after a data service corresponding to the data service request is completed.

Optionally, in another embodiment, in a process of establishing the data connection for the data service request according to the data service request and the current usage status of the channel resource in the modem 1540, the processor 1510 is further configured to select the idle channel resource to establish a second data connection for the data service request in the virtual resource sharing control system 1553, when an idle channel resource is in the modem 1540. The processor 1510 is further configured to release the second data connection in the virtual resource sharing control system 1553, after a service corresponding to the data service request is completed.

In addition, the mobile terminal 1500 may further implement functions of the embodiments shown in FIG. 6 to FIG. 8 and expanded embodiments thereof. Details are not described in this embodiment of the present disclosure.

Figure 16:
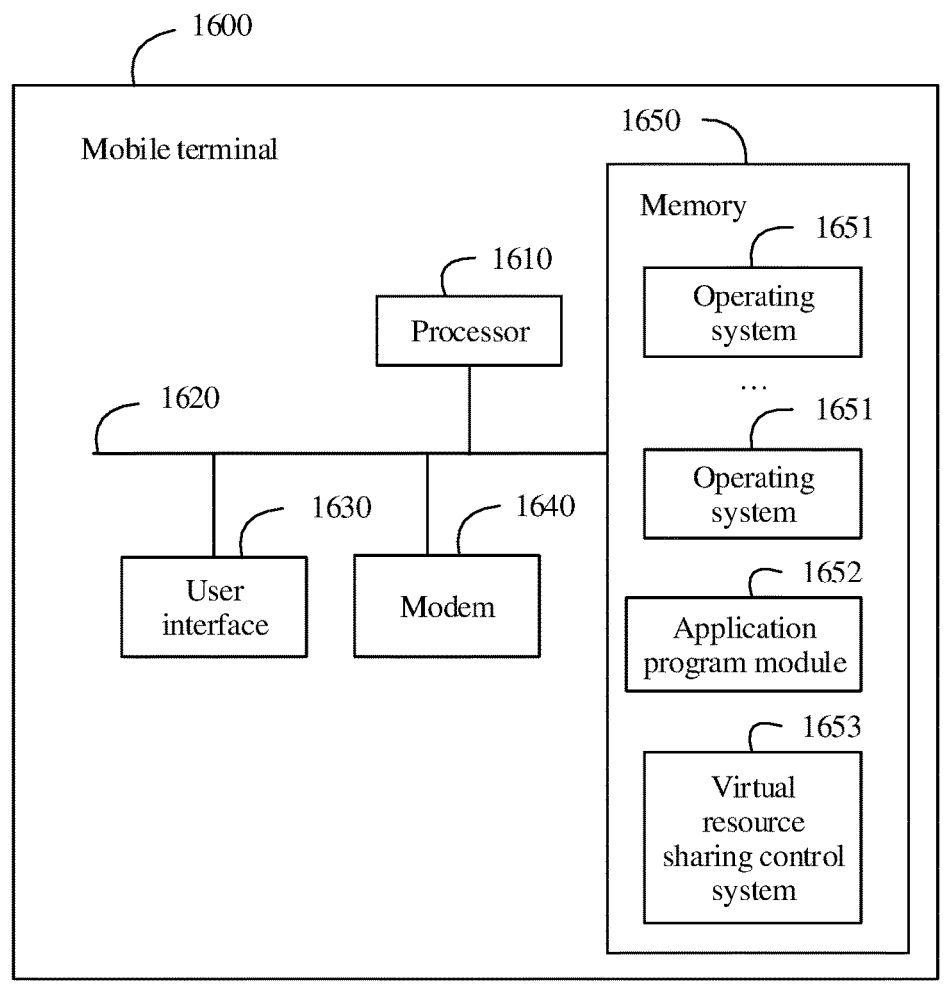
FIG. 16 is still another schematic structural diagram of a mobile terminal according to an embodiment of the present disclosure.

FIG. 16 describes a structure of a mobile terminal 1600 according to an embodiment of the present disclosure. The mobile terminal 1600 includes at least one processor 1610, at least one modem 1640 or a user interface 1630, a memory 1650, and at least one communications bus 1620. The communications bus 1620 is configured to implement connection and communication between these components. Optionally, the mobile terminal 1600 includes the user interface 1630, which includes a display (for example, a touchscreen, an LCD, a CRT, a holographic imaging device, or a projector), a keyboard, or a click device (for example, a mouse, a trackball, a touchpad, or a touchscreen). In this embodiment of the present disclosure, the modem 1640 may be configured to provide a channel resource for a data connection of the mobile terminal 1600.

The memory 1650 may include a ROM and a RAM, and provides an instruction and data for the processor 1610. A part of the memory 1650 may further include an NVRAM.

In some implementation manners, the memory 1650 stores the elements, such as an executable module or a data structure, or a subset of the executable module and the data structure, or an extended set of the executable module and the data structure, such as multiple operating systems 1651, including various system programs such as the framework layer, the kernel library layer, and the driver layer shown in FIG. 1, and configured to implement various basic services and process a hardware-based task, an application program module 1652, including various application programs such as the home screen, the media player, and the browser shown in FIG. 1, and configured to implement various application services, and a virtual resource sharing control system 1653, including a virtual resource sharing control interface such as the virtual machine of the kernel library layer shown in FIG. 1, and configured to implement an access control interface between an operating system and a hardware layer.

In this embodiment of the present disclosure, by invoking a program or an instruction stored in the memory 1650, the processor 1610 is configured to, in a first operating system in the multiple operating systems 1651, receive a data service request of a user of the mobile terminal 1600, and notify a second operating system and the virtual resource sharing control system 1653 of the data service request, where a new data connection needs to be established for the data service request. The first operating system is an operating system that is in the multiple operating systems 1651 and that runs in foreground, and the second operating system is one or more operating systems, except the first operating system, in the multiple operating systems 1651, or the second operating system is all other operating systems, except the first operating system, in the multiple operating systems 1651, in the virtual resource sharing control system 1653, establish a data connection for the data service request according to the data service request and a current usage status of the channel resource in the modem 1640, and send a second feedback result of data connection establishment to the first operating system and the second operating system, in the first operating system, manage and monitor a usage status of the channel resource in the first operating system according to the second feedback result, and in the second operating system, manage and monitor a usage status of the channel resource in the second operating system according to the data service request or the second feedback result.

In this embodiment of the present disclosure, in addition to multiple operating systems 1651, a virtual resource sharing control system 1653 is set in a mobile terminal 1600 in order to perform coordinated management on a channel resource in a modem 1640 for the multiple operating systems 1651, notify another operating system when an operating system running in foreground requests a channel resource, and after an operation (including channel resource allocation and channel resource release) is completed, notify the multiple operating systems 1651 using the virtual resource sharing control system 1653. In this way, each operating system of the mobile terminal 1600 monitors and manages a usage status of the channel resource of the mobile terminal 1600 in a real time manner, consistency is ensured in the usage statuses of the channel resource in the mobile terminal 1600, and the mobile terminal 1600 implements coordinated management of the channel resource in the multiple operating systems 1651.

Further, the modem 1640 is further configured to provide a channel resource for a data connection of the mobile terminal 1600. Optionally, an operating system 1651 may further include a UI processing unit (not shown), an upper-layer logic processing unit (not shown), and a resource management unit (not shown). In this case, the processor 1610 is further configured to in a UI processing unit in the first operating system, receive the data service request, and notify an upper-layer logic processing unit in the current operating system of the data service request, in an upper-layer logic processing unit in the first operating system, notify a resource management unit in the first operating system of the data service request, in the resource management unit in the first operating system, manage and monitor the usage status of the channel resource in the first operating system according to the data service request, and notify the virtual resource sharing control system 1653 such that the virtual resource sharing control system 1653 allocates a corresponding channel resource to the data service request to establish the data connection, in the upper-layer logic processing unit in the first operating system, notify an upper-layer logic processing unit in the second operating system of the data service request, in the upper-layer logic processing unit in the second operating system, notify a resource management unit in the second operating system of the data service request, in the resource management unit in the second operating system, manage and monitor the usage status of the channel resource in the second operating system according to the data service request, in the resource management unit in the first operating system, receive the second feedback result, and manage and monitor the usage status of the channel resource in the first operating system according to the second feedback result, and in the resource management unit in the second operating system, receive the second feedback result, and manage and monitor the usage status of the channel resource in the second operating system according to the second feedback result.

Optionally, in an embodiment, in a process of establishing the data connection for the data service request according to the data service request and the current usage status of the channel resource in the modem 1640, the processor 1610 is further configured to, in the virtual resource sharing control system 1653, when no idle channel resource is in the modem 1640, select a currently-used channel resource in the modem 1640, disable a first data connection of the currently-used channel resource, and establish a second data connection for the data service request. The processor 1610 is further configured to release the second data connection, and restore the first data connection in the virtual resource sharing control system 1653, after a data service corresponding to the data service request is completed.

Optionally, in another embodiment, in a process of establishing the data connection for the data service request according to the data service request and the current usage status of the channel resource in the modem 1640, the processor 1610 is further configured to in the virtual resource sharing control system 1653, when an idle channel resource is in the modem 1640, select the idle channel resource to establish a second data connection for the data service request. The processor 1610 is further configured to release the second data connection in the virtual resource sharing control system 1653, after a service corresponding to the data service request is completed.

In addition, the mobile terminal 1600 may further implement functions of the embodiments shown in FIG. 7 and FIG. 8 and expanded embodiments thereof. Details are not described in this embodiment of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logic function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A mobile terminal, comprising:
a first and a second operating system, the first operating system configured to:
receive, via a user interface, a card operation request for a subscriber identity module (SIM) card;
notify the second operating system of the card operation request; and
a virtual resource sharing control system coupled to the first and the second operating system, the virtual resource sharing control system configured to perform coordinated management on card operations on the SIM card for the first and the second operating systems, and send a feedback result of the card operation to the first operating system according to the card operation request and a status of the SIM card, the first operating system forwarding the feedback result to the second operating system.

2. The mobile terminal of claim 1, wherein the card operation comprises at least one of:
a SIM card startup operation;
a SIM card activation operation;
a SIM card deactivation operation; or
a SIM card switching operation.

3. The mobile terminal of claim 1, further comprising a modem in which the SIM card is deployed, the modem being operable to provide a channel resource for a data connection, wherein the first operating system is further configured to:
receive a data service request; and
notify the second operating system and the virtual resource sharing control system of the data service request,
wherein the virtual resource sharing control system is further configured to:
perform coordinated management on usage of the channel resource for the first and the second operating systems;
establish, responsive to the data service request and based on a usage status of the channel resource, a data connection; and
send a second feedback result of relating to data connection establishment for the first operating system and the second operating system.

4. The mobile terminal of claim 3, wherein when no idle channel resource is in the modem, select a currently-used channel resource in the modem, disable a first data connection of the currently-used channel resource, and establish a second data connection for the data service request; and
the virtual resource sharing control system is further configured to, when the usage status indicates that an idle channel resource is unavailable:
select a currently-used channel resource of the modem;
disable the data connection of a currently-used channel resource; and
establish, in response to the data service request, a second data connection.

5. A mobile terminal, comprising:
a modem configured to provide a channel resource for a data connection of the mobile terminal;
a first and a second operating system coupled to the modem, the first operating system configured to:
receive a data service request; and
notify the second operating system of the data service request; and
a virtual resource sharing control system coupled to the modem and the first and the second operating systems, the virtual resource sharing control system configured to:
establish, in response to the data service request, a data connection and a current usage status of the channel resource in the modem; and
send a feedback result of the data connection to the first operating system, the first operating system forwarding the feedback result to the second operating system.

6. The mobile terminal of claim 5, wherein when the usage status indicates that an idle channel resource is unavailable in the modem, the virtual resource sharing control system is further configured to:
select a currently-used channel resource in the modem;
disable a first data connection of the currently-used channel resource; and
establish a second data connection for the data service request, and
wherein after a data service corresponding to the data service request is completed, the virtual resource sharing control system is further configured to:
release the second data connection; and
restore the first data connection.

7. A resource management method of a mobile terminal, the method comprising:
receiving, by a first operating system, a card operation request for a subscriber identity module (SIM) card;
notifying, by the first operating system, a second operating system and a virtual resource sharing control system of the card operation request,
managing and monitoring, by the second operating system, a status of the SIM card;
performing, by the virtual resource sharing control system, a card operation on the SIM card based on the card operation request and the status of the SIM card; and
sending, by the virtual resource sharing control system, a first feedback result of the card operation to the first operating system and the second operating system.

8. A resource management method for a mobile terminal, the method comprising:
receiving, by a first operating system, a data service request;
notifying, by the first operating system, a second operating system and a virtual resource sharing control system of the data service request;
managing and monitoring, by the second operating system, a usage status of a channel resource in the second operating system based on the data service request;
establishing, by the virtual resource sharing control system, a data connection for the data service request via a modem;
sending, by the virtual resource sharing control system, a feedback result of data connection establishment to the first operating system, the first operating system forwarding the feedback result to the second operating system.

9. A mobile terminal, comprising:
a processor;
a modem including a subscriber identity module (SIM) card; and
a memory coupled to the processor and the modem and configured to store instructions that, when executed, cause the processor to:
receive, using a first operating system, a card operation request of a user of the mobile terminal for a SIM card;
notify a second operating system of the card operation request,
manage and monitor, using the second operating system, a status of the SIM card based on the card operation request;
perform, through the modem, the card operation on the SIM card; and
send a first feedback result of the card operation to the first operating system and the second operating system.

10. The mobile terminal of claim 9, wherein further instructions, when executed, cause the processor to:
receive the card operation request through a user interface of the first operating system;
notify a virtual resource sharing control system to perform a card operation corresponding to the card operation request;
notify, through the first operating system, the second operating system of the card operation request;
receive a feedback result in the resource management processor in the first operating system; and
notify, through the first operating system, the second operating system of the feedback result.

11. The mobile terminal of claim 9, wherein the card operation comprises at least one of:
a SIM card startup operation;
a SIM card activation operation;
a SIM card deactivation operation; or
a SIM card switching operation.

12. The mobile terminal of claim 9, wherein the memory stores further instructions that when executed cause the processor to:
receive, in the first operating system, a data service request;
notify the second operating system;
establish, in response to the data service request, a data connection based on a usage status of the channel resource of the modem; and
send a second feedback result to the first operating system, the first operating system forwarding the second feedback result to the second operating system.

13. The mobile terminal of claim 9, the memory stores further instructions that when executed cause the processor, when the channel status indicates an idle channel resource is unavailable, to:

select a currently-used channel resource in the modem;
   disable a first data connection of the currently-used channel resource; and
   establish, responsive to the data service request, a second data connection.

14. A non-transitory computer-readable storage medium comprising instructions which, when executed by a computer, cause the computer to:

receive a card operation request of a user of a mobile terminal for a first subscriber identity module (SIM) card;
   notify a second operating system and a virtual resource sharing control system of the card operation request,
   perform coordinated management on card operations on the SIM card for the first and the second operating system; and
   send a first feedback result of the card operation to the first operating system and according to the card operation request and a status of the SIM card, the first operating system forwarding the first feedback result to the second operating system.

15. A non-transitory computer-readable storage medium comprising instructions which, when executed by a processor, prompt the processor to:

receive, using a first operating system, a data service request from a user interface of a mobile terminal;
   notify a second operating system,
   perform coordinated management on usage of a channel resource for the first and the second operating system;
   establish a data connection for the data service request and a usage status of the channel resource;
   send a feedback result relating to the data connection to the first operating system, the first operating system forwarding the feedback result to the second operating system.

* * * * *